United States Patent
Plaza Fernández et al.

(10) Patent No.: US 6,377,992 B1
(45) Date of Patent: Apr. 23, 2002

(54) METHOD AND SYSTEM FOR INTEGRATION OF SEVERAL PHYSICAL MEDIA FOR DATA COMMUNICATIONS BETWEEN TWO COMPUTING SYSTEMS IN A MANNER TRANSPARENT TO LAYER #3 AND ABOVE OF THE ISO OSI MODEL

(76) Inventors: José Fabián Plaza Fernández; Carlos Zamora; Francisco Manuel Garcia Gómez; Jaime Aguilar Ruiz; José Ignacio Guzmán; Ramón Merchán Sanzano; Alejandro Macarrón Larumbe, all of Paseo de la Habana, 26, 28036 Madrid (ES)

( * ) Notice: Subject to any disclaimer, the term of this patent is extended or adjusted under 35 U.S.C. 154(b) by 0 days.

(21) Appl. No.: 08/956,562

(22) Filed: Oct. 23, 1997

(30) Foreign Application Priority Data

Oct. 23, 1996 (ES) ................................ 9602244

(51) Int. Cl.[7] .......................... G06F 15/16; H04L 12/66
(52) U.S. Cl. ..................... 709/227; 709/250; 370/463
(58) Field of Search ................. 709/227–228, 709/321, 324, 327, 250; 370/463

(56) References Cited

U.S. PATENT DOCUMENTS

| | | | | |
|---|---|---|---|---|
| 5,586,121 A | * | 12/1996 | Moura et al. | 370/404 |
| 5,659,615 A | * | 8/1997 | Dillon. | 380/21 |
| 5,852,721 A | * | 12/1998 | Dillon et al. | 709/217 |
| 5,925,117 A | * | 7/1999 | Kirby et al. | 710/101 |
| 5,995,725 A | * | 11/1999 | Dillon | 395/200.33 |
| 5,995,726 A | * | 11/1999 | Dillon | 395/200.61 |
| 6,041,356 A | * | 3/2000 | Mohammed | 709/227 |
| 6,115,750 A | * | 9/2000 | Dillon et al. | 709/235 |
| 6,161,141 A | * | 12/2000 | Dillon | 709/230 |

OTHER PUBLICATIONS

Feibel, W., "The Encyclopedia of Networking," Network Press, pp. 746–757, Feb. 1996.*

* cited by examiner

Primary Examiner—Zarni Muang
Assistant Examiner—Andrew Caldwell
(74) Attorney, Agent, or Firm—Ladas & Parry

(57) ABSTRACT

A method and apparatus implements bi-directional communications using the same or different physical media linking any two computing systems, nodes, employing routable protocols such as TCP/IP, IPX/SPX, etc., connected to a common network, allowing bi-directional communication between them. One of the physical media preferably has a wider bandwidth in one direction than another one of the physical media operating in the other direction. The present invention also provides for optimizing traffic between any two nodes by appropriately selecting communication paths based on either bandwidth or costs. Communication between any two nodes can be split between several different physical or logical paths to either increase the effective transmission bandwidth or to provide communication redundancy. A method and system implements an Integrated Virtual Interface (IVI) which combines in a single virtual interface at least two physical interfaces per communication node (one for each communication direction) in a transparent manner such that operations of level #3 and above in the ISO (International Organization for Standardization) OSI (Open Systems Interconnection) model for data communication protocols and the levels above #3 function as if a single bi-directional communication interface exists while the lower OSI levels #1 and #2 maintain all their standard functionality.

11 Claims, 19 Drawing Sheets

Integration of several physical media for data communications between two computing systems in a transparent way for layer #3 in the ISO MODEL DI: Data Input to system Processor
DO: Data Output from system Processor
ID: IP Address (IP Identification)
IF A1,B1,A2,B2,: Interface identification Integration of several physical media for data communications between two computing systems in a transparent way for layer #3 in the ISO MODEL

A-

⟶ Information from client to

⟶ Information from server to

⟷ Equivalent Bidirectional

B-

Integration of several physical media for data communications between two computing systems in a transparent way for layer #3 in the ISO MODEL IR: Information Request (by the user or client)
IU: Information Requested by the user or client

METHOD AND SYSTEM FOR INTEGRATION OF SEVERAL PHYSICAL MEDIA FOR DATA COMMUNICATIONS BETWEEN TWO COMPUTING SYSTEMS IN A MANNER TRANSPARENT TO LAYER #3 AND ABOVE OF THE ISO OSI MODEL

BACKGROUND OF THE INVENTION

Present invention relates to a system and method for effecting bi-directional communication between computing systems, and more particularly to a method and system for effecting communications over multiple data channels of different bandwidths wherein the user computer usually sends data over a narrow bandwidth channel and the server returns data over a broad bandwidth channel. The method and system functions in a manner transparent to layers #3 and above of the OSI model while also being transparent to layer #1 and #2.

There are products available for interactive data communications between computing systems by which the users request and receive a large volume of information but generate much less data, as is the usual case of internet navigation and communication. The users typically demand much larger amounts of data, multimedia Web pages for example, than what they themselves generate. The users usually generate just a few mouse clicks and the TCP/IP packet reception acknowledgments in exchange for the multimedia Web pages. This fact has prompted the discussion and implementation of bi-directional communications that are "asymmetric" regarding the transmission capacities in the two communication directions.

Examples of the aforementioned products are the so called "cable modems" which allow a cable TV subscriber who wishes to navigate ("surf") the Internet, to receive the Internet data at a very fast rate (500 Kbps to 5–10 Mbps) from a cable TV coaxial cable network, while sending the requests to the Internet via a regular telephone line. A similar implementation for high speed asymmetric communications is the system known as DirecPC, from Hughes Corporation, which provides fast Internet navigation using a satellite downlink as a broadband channel and a an interface card which embeds unidirectional high speed modem.

However, standard interactive data transmission protocols such as TCP/IP are devised for dealing with symmetric communications using a single physical communications interface and logical identifier per node (for instance, in TCP/IP the so called "IP address"). The protocols cannot deal with the fact that, for such asymmetric communications, two different transmission media are better suited for the task of bi-directional communication such as a high bandwidth broadcast unidirectional channel from the network server to the user, such as fiber optic, coaxial cable, satellite, microwaves, etc., and a narrowband bi-directional channel from the user to the network such as standard telephone lines. Such communication demands the use of two physical interfaces per node, one for each communication direction, and accordingly, two logical network identifications or IP addresses (in TCP/IP) per node.

Hence, there is a need for an open method and system able to accommodate two communication links in standard data transmission protocols, such as TCP/IP, without altering the interface to the upper levels of the protocols that are more directly linked to user applications such as levels #3 and above in the OSI model. This is necessary to permit any off-the-shelf application software, such as standard Web browsers, to run in a dual path communication environment without modification, and without altering them as well in a noticeable way regarding interfacing to the lower levels that deal with the physical communications, levels #1 and #2, so as to permit using the standard communication protocols dealing with the physical and logical link between two communicating computers.

SUMMARY OF THE INVENTION

Accordingly, it is an object of the invention to provide a system and method for bi-directional communication which overcomes the drawbacks of the prior art.

It is a further object of the invention to provide a method and system permitting the use of different transmission media for each direction of communication but a single identification of nodes at layer #3 of the OSI model, through an Integrated Virtual Interface (IVI) that controls two or more physical (or virtual) interfaces in conjunction with a single identification from layer level #3, without modifying the characteristics of the protocol used, permitting the identification of an information processing node through a name or direction independent from the various connection interface identifications.

It is a still further object of the invention to provide a method and system utilizing the OSI model and incorporating a one-way channel as part of a single bi-directional virtual link, as long as there is at least one communication link available for each direction of communication.

It is yet another object of the invention to provide a method and system utilizing the OSI model and permitting a shared one-way broadcast channel to be used for interactive data communications, keeping communication costs down by accommodating in it many simultaneous users who benefit from its high bandwidth, due to the bursty nature of most data communications like Internet surfing.

An object of the present invention is to provide a method and system permitting highly asymmetric data flow with regard to the balance between both communication directions wherein one or more physical links is a broadband channel and one or more physical links is a narrowband channel used for the opposite direction of communication.

Another object of the present invention is to provide a method and system for increasing communication speed and/or reliability by providing communication in any directions which may be split through diverse communication links to increase the available bandwidth and/or the transmission redundancy.

Additionally, an object of the present invention is to provide a method and system for increasing a capacity of a conventional network over a determined physical medium, adding a new transmission medium for one of the communication directions, without any alteration of the original network, the services or the applications of the remote nodes, permitting the reduction in the required capacity in the original network for the same services or even an increase in service capabilities, as a result of diverting the traffic in one of the directions through the new medium.

Yet another object of the present invention is to provide a method and system providing increased communication reliability which in the case of a temporary failure of one physical link, data transmission is switched to another physical link provided there is at least one communication link available for each direction of communication.

It is a further object of the present invention to provide a system and method for using several physical communication paths during a communication session for data transmission between any two computers, in particular computers effecting asymmetric data communications such as Internet traffic, or to provide several parallel communication paths for increasing communication speed or implementing fault tolerant communication links for mission critical communications. An embodiment of the invention uses a combination of a high bandwidth broadcast unidirectional channel from a network server to a user, such as a satellite, microwave or fiber optic link, and narrowband bi-directional channel from the user to the network server, such as a standard telephone, X.25 or Frame relay line.

The present invention provides an apparatus and method for implementing an Integrated Virtual Interface (hereinafter IVI) which permits use of unaltered standard routable data communication protocols, such as TCP/IP, for multipath communications, wherein the standard data communications protocols are not configured for multipath communication, thus ensuring compatibility with existing application software and operating systems.

In accordance with an embodiment of the present invention, a computer system is configured by an IVI program inserted between the OSI model sub-layers #2.1 (Media Access Control sub-layer) and #2.2 (Logical Link Control sub-layer), which provides a switching service at layer level #3 (network level, called "IP level" in communications using protocol such as TCP/IP) for several different physical interfaces optionally used for incoming and/or outgoing data and which is transparent to layer #3 operation. The IVI program passes incoming data, from a given real physical interface and a corresponding real NIC (Network Interface Card) to a real transport driver. The IVI program also passes outgoing data, to be transmitted through a different real NIC and physical interface, through a reverse path from a real transport driver to the different real NIC and physical interface (usually different from the incoming data physical interface) to the different real NIC. The IVI program thus functions as a (virtual) bi-directional interface that integrates several communication paths for data transmission and switches the data to the desired physical and logical path in a manner transparent to a remainder of communication protocol layers.

In accordance with these and other objects of the invention, there is provided an apparatus for executing bi-directional communication with another apparatus wherein the apparatus has a processor and memory and the apparatus is configured to execute operations in accordance with the ISO OSI model for data communications including network layer means for executing a network layer set of operations for communicating over a single physical link having a unique address and a data link layer means for executing a set of data link operations in response to the operations of the network layer means, each in accordance with the ISO OSI model, the apparatus comprising: a first network interface card for communicating data over a first physical link connected with the another apparatus in a first direction to the another apparatus; the data link layer means including a first data link driver means for controlling the first network interface card; a second network interface card for communicating data over a second physical link connected with the another apparatus in a second direction from the another apparatus; the data link layer means including a second data link driver means for controlling the second network interface card; first interfacing means for receiving output data from the operations of the network layer means to be transmitted in the first direction associated with the unique address and for controlling the data link layer means to effect transmission of the output data via the first network interface card; and second interfacing means for receiving input data from the operations of the data link layer means which is transmitted in the second direction and received by the second network interface card for transferring the input data to the operations of the network layer means in association with the unique address.

The present invention also provides an apparatus for executing bi-directional communication with another apparatus wherein the apparatus has a processor and memory and the apparatus is configured to execute operations in accordance with the ISO OSI model for data communications including network layer means for executing a network layer set of operations for communicating over a single physical link having a unique address and a data link layer means for executing a set of data link operations in response to the operations of the network layer means, the data link layer means including a logical link controller means for performing logical link operations and a media access control means for performing media access operations which are configured to interface with each other, each in accordance with the ISO OSI model, the apparatus comprising: a first network interface card for communicating data over a first physical link connected with the another apparatus in a first direction to the another apparatus; the media access control means including a first data link driver means for controlling the first network interface card; a second network interface card for communicating data over a second physical link connected with the another apparatus in a second direction from the another apparatus; the media access control means including a second data link driver means for controlling the second network interface card; intermediate interfacing means for interfacing with the logical link controller means in place of the media access control means and exchanging data in association with the unique address, and for interfacing with the first and second data link driver means and exchanging the data with the first and second data link driver means in association with respective ones of the first and second real addresses such that the logical link controller means performs logical link operations associated only with the unique address.

According to a feature of the invention, there is further provided the first network interface card including means for performing bi-directional communications over the first physical link; initiation means for initiating bi-directional communication with the another apparatus via the first network interface card and instructing the another apparatus to initiate communication via the second physical link and the second network interface card; and communication control means, responsive to establishment of the communication via the second physical link and the second network interface card, for conducting uni-directional communication sending data to the another apparatus using the first network interface card.

According to yet another feature of the invention, there is further provided backup means for reestablishing bi-directional communication with the another apparatus using the first network interface card and the first physical link when the communication via the second physical link and the second network interface card fails.

The present invention also provides an apparatus for executing bi-directional communication with another apparatus wherein the apparatus has a processor and memory and the apparatus is configured to execute operations in accordance with the ISO OSI model for data communications including network layer means for executing a network layer set of operations for communicating over a single physical link having a unique address and a data link layer means for executing a set of data link operations in response to the operations of the network layer means, the data link layer means including a logical link controller means for performing logical link operations and a media access control means for performing media access operations which are configured to interface with each other, each in accordance with the ISO OSI model, the apparatus comprising: a first network interface card for communicating data over a first physical link connected with the another apparatus in a first direction to the another apparatus; the media access control means including a first data link driver means for controlling the first network interface card; a second network interface card for communicating data over a second physical link connected with the another apparatus in a second direction from the another apparatus; the media access control means including a second data link driver means for controlling the second network interface card; first intermediate interfacing means for interfacing with the logical link controller means in place of the media access control means and exchanging data in association with the unique address; and second intermediate interfacing means for interfacing with the first and second data link driver means and exchanging the data with the first and second data link driver means, the second intermediate interfacing means including means for interfacing with the first intermediate interfacing means.

The present invention also provides an apparatus for executing bi-directional communication with another apparatus wherein the apparatus has a processor and memory and the apparatus is configured to execute operations in accordance with the ISO OSI model for data communications including network layer means for executing a network layer set of operations for communicating over a single physical link having a unique address and a data link layer means for executing a set of data link operations in response to the operations of the network layer means, the data link layer means including a logical link controller means for performing logical link operations having a lower 2.2 sublayer interface and the data link layer means including a media access control means for performing media access operations having an upper 2.1 sublayer interface, each in accordance with the ISO OSI model, the apparatus comprising: a first network interface card for communicating data over a first physical link connected with the another apparatus in a first direction to the another apparatus; the media access control means including a first data link driver means for controlling the first network interface card; a second network interface card for communicating data over a second physical link connected with the another apparatus in a second direction from the another apparatus; the media access control means including a second data link driver means for controlling the second network interface card; first intermediate interfacing means having an upper 2.1 sublayer interface for interfacing with the lower 2.2 sublayer interface of the logical link controller means in place of the media access control means and exchanging data in association with the unique address; and second intermediate interfacing means having a lower 2.2 sublayer interface for interfacing with the upper 2.1 sublayer interface of the media access control means to communicate with the first and second data link driver means and exchange the data with the first and second data link driver means in association with respective ones of the first and second real addresses, the second intermediate interfacing means including means for interfacing with the first intermediate interfacing means.

The above, and other objects, features and advantages of the present invention will become apparent from the following description read in conjunction with the accompanying drawings, in which like reference numerals designate the same elements.

DETAILED DESCRIPTION OF THE PRESENT INVENTION

The present invention provides a method effecting bi-directional data communication and a computer system configured to implement the method for bi-directional communication. It is understood that such a computer system includes a central processor and a memory for storing programs configuring the computer system and other data to be transmitted, received or acted upon.

Figure 1:
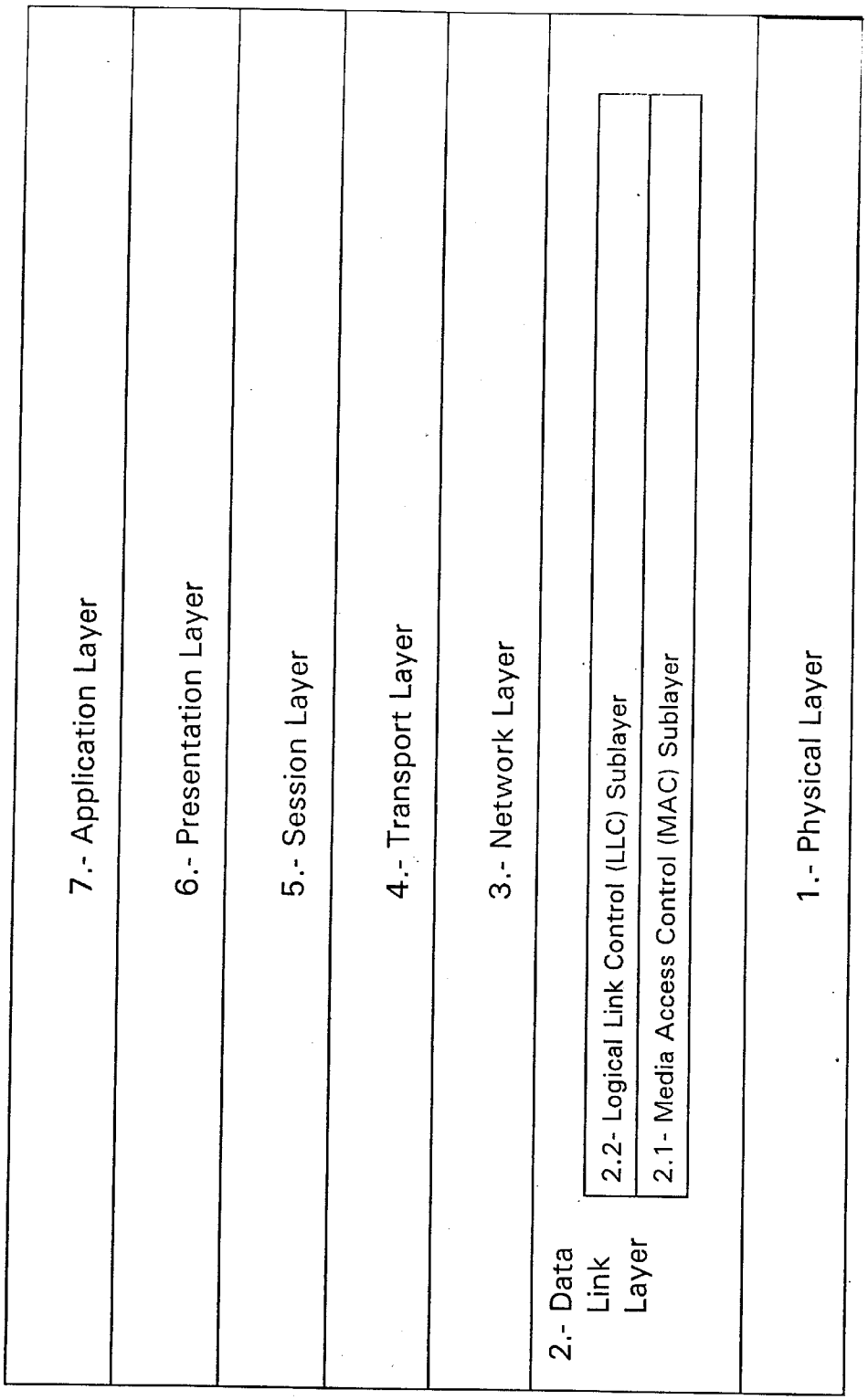
FIG. 1 is the ISO OSI reference model for computer system operation.

Referring to FIG. 1, the ISO OSI reference model for data communications has all the necessary tasks and levels involved in a communication between two computer applications partitioned into a hierarchical set of layers. Software constituting each layer performs a related subset of the functions required to communicate with another computing system and relies on the next lower layer to perform more primitive functions and to conceal the details of those functions while providing services to the immediate higher layer. Of the highest concern in the present invention is layer #3 (network layer, or IP in TCP/IP protocol which handles Internet type of traffic) which assigns to each bi-directional interface at least one network address (the node "IP address" in TCP/IP).

It is recognized that in situations involving communications between computers using the Internet, which result in traffic patterns usually requiring a much larger bandwidth in a path from the server to the user than vice versa, interactive network-oriented connectivity, and a bursty nature of traffic, the most cost-efficient communication channel is one in which a two-way interaction results from combining: i) a one-way broad bandwidth point-to multipoint channel from the server to the user (such as satellite, fiber/coax or point-to-multipoint microwave systems such as in MMDS/LMDS) which is shared by many simultaneous users; and ii) a narrower bandwidth point-to-point link such as a standard telephone line, X.25 or Frame relay lines, from each user to the server.

The simultaneous use of two different communication paths presents two problems when the existing protocols are used. The first is that such dual path communication using two physical communication interfaces per node would result in the standard layer #3 assigning two network/IP addresses per node and potentially disabling certain standard applications that deal directly with level #3 such as FTP (File Transfer Protocol) or Web Browsers. The second problem is how to handle one-way channels using protocols devised for two-way channel interfaces. The present invention overcomes the above problems to establish cost-efficient high bandwidth interactive data communications using dual path communication.

An embodiment of a method and apparatus provided by the present invention overcomes the above problems by providing an additional intermediate layer of software controlled operations, below level #3 (which is the lowest level directly addressed by existing software applications) and within level #2 (which controls the physical input/output data interfaces) between sublayers of level #2, that conceals the existence of two or more physical communication interfaces employed in a given data communication session in a transparent way such that none of the standard protocol processes (the protocol stack) is altered and or reacts to the presence of the multiple physical interfaces. The new intermediate layer is referred to herein as an "Integrated Virtual Interface" (hereinafter IVI), because it implements by software a virtual single bi-directional interface that combines several physical communication interfaces which are unidirectional or bi-directional.

To see in further detail where the IVI operations are inserted within the standard protocol stack for practical implementations, we will refer hereinafter to the NDIS (Network Driver Interface Specification) architecture because of its advantages and widespread use for data communications. However, it is within the scope and spirit of the present invention to implement the IVI operation of the present invention for any routable data communication protocol that follows the OSI model.

In NDIS systems, there are three different kinds of network drivers: Network Services, Network Transport Drivers and Network Adapter Drivers (also referred to as NIC (Network Interface Card) Drivers). Network Services are the highest-level drivers in NDIS protocol stacks, implementing Layer #5 protocols and Layer #5–Layer #4 lower interfaces. Network Transport Drivers lay below Network Services, implementing Layer #4, Layer #3 and Sublayer #2.2 protocols, Layer #5–Layer #4 upper interfaces and Sublayer #2.2–Sublayer #2.1 lower interfaces. Network Adapter Drivers are the lowest drivers in NDIS protocol stacks, implementing Layer #2.1 protocols and Sublayer #2.2–Sublayer #2.1 upper interfaces.

Under this architecture, there are two possible locations for the IVI network drivers: between Network Services and Network Transport Drivers; or between Network Transport Drivers and Network Adapter Drivers. The present invention implements the second alternative in order to allow the existence of a unique network identifier for each communication node (there is a different network identifier for each link between a Network Transport Driver and a Network Adapter Driver).

Figure 2:
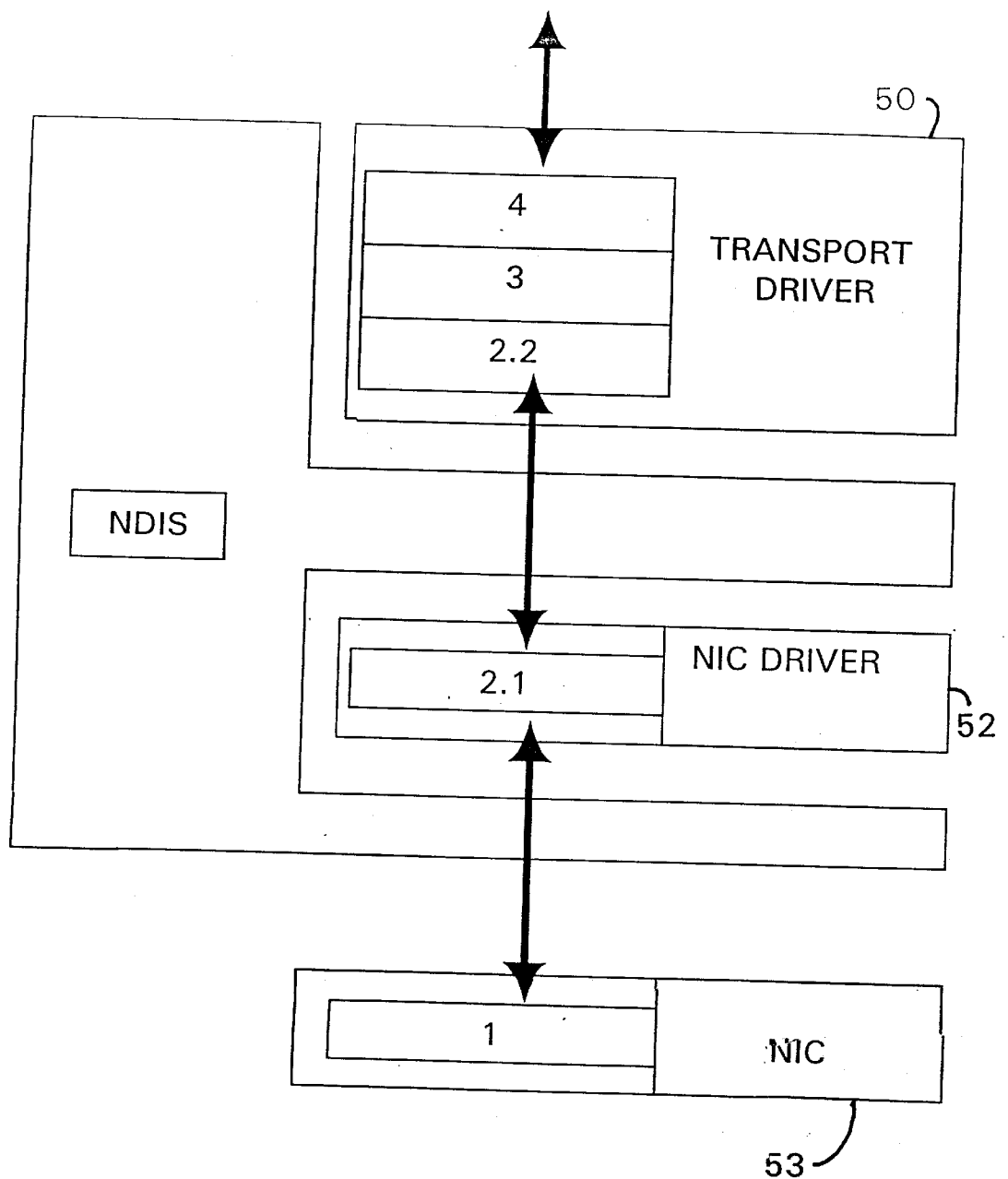
FIG. 2 is a system architecture plan of the lowest four OSI model layers in NDIS (Network Driver Interface Specification) systems, for Windows 95, Windows NT, some versions of Unix, OS/2, among others.

Referring to FIG. 2, the four lower levels of the OSI model (the layers involved the actual data transport) are illustrated in an environment where the NDIS architecture is used. NDIS is a standard that allows software developers to write device drivers that are independent of the operating system (OS) employed. Thus, it is usable for Windows '95, Windows NT, and some versions of Unix, OS/2, etc. NDIS assembles layers #1 through #4 into three "monolithic" blocks that communicate between them via the NDIS primitives: the Transport Driver 50 grouping layers 2.2, 3 and 4, the NIC (Network Interface Card) driver 52 including layer 2.1, and the NIC 53 itself. Since the NIC driver 52 is concerned only with writing/reading the data to and from the given NIC 53, the IVI operations are configured to interface between the Transport Driver 50 operations and the NIC Driver 52 operations.

Each layer in the OSI model implements a certain protocol. For instance, TCP protocol in layer #4, IP protocol in layer #3, Ethernet II protocol in layer #2. In order to communicate between two systems, it is necessary that both have drivers implementing the same protocols in the same layers.

Between any two adjacent layers in the OSI model there is a pre-defined set of interfaces. Each driver of any of the layers must "understand" at least one of such interfaces to be able to communicate with the drivers of the adjacent upper layers and lower layers ("upper" interfaces and "lower" interfaces, respectively).

An operating system permits the installation of several drivers for each of the layers. The installation program for each driver provides information to the operating system about which are the upper and lower interfaces that are "understood" by an installed driver. According to this information, the operating system creates a database that stores all the possible paths through which the information may flow, from application programs to the physical transmission media and vice versa. The operating system allows a system administrator to enable or disable any of such information paths in the aforementioned database.

Each of the information paths is described by a series of controllers through which the information must flow. Since each controller implements a protocol for each of the layers it encompasses, such path can be called "protocol stack".

Therefore, a very simple view of the OSI model framework may be the following:

There is a different driver for each layer.

Each driver of a later #n (for n between 1 and 6) has an upper interface with the layer #n+1.

Each driver of a layer #n (for n between 2 and 7) has a lower interface with the layer #n−1.

Nevertheless, it is possible to install drivers with upper interfaces that correspond to layers that are lower than those of their lower interfaces. In this way, it is possible to create "protocol stacks" in which the functionality corresponds to a given set of drivers while the information is forced to flow through a different set of drivers. As explained in further detail below, the IVI layer of the present invention operates in this manner, preserving full functionality of the upper layers #7 to #2.2- and the lower layers -#2.1 to 1-, but forcing information to flow through the IVI intermediate layer having an upper interface -#2.1- that is lower to its lower interface -#2.2-.

Figure 3:
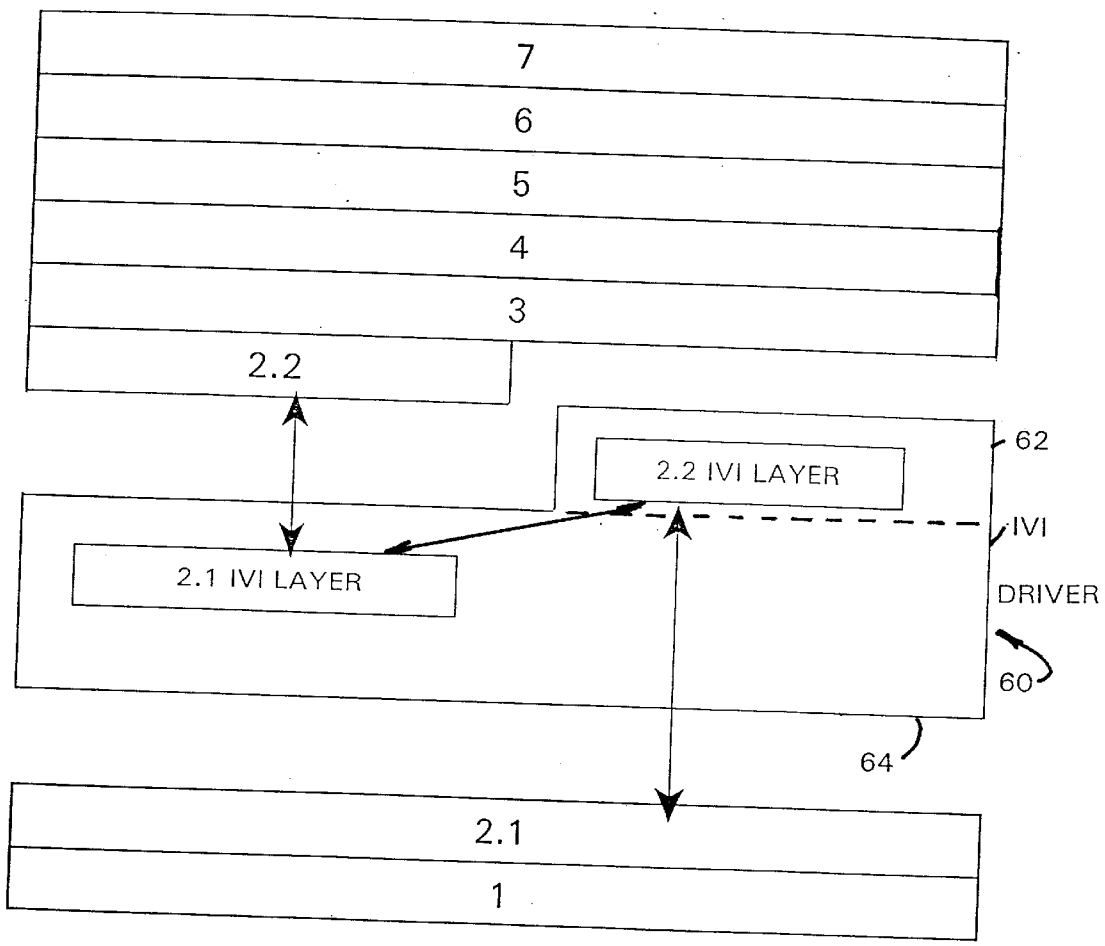
FIG. 3 is a system architecture plan of an embodiment of the present invention incorporating an IVI into the OSI model.

Referring to FIG. 3, IVI module (driver) 60 of operations is shown incorporated into the general OSI model. The IVI module 60 is made of two sub-drivers. The IVI Transport Driver 62 includes a 2.2 IVI layer for performing operations of layer #2.2 functions and is a network transport driver linked to Network Adapter Drivers existing in the system. The IVI Virtual NIC Driver 64 includes a 2.1 IVI layer for performing operations of layer #2.1 functions. The IVI Virtual NIC Driver 64 is linked to Network Transport Drivers existing in the system (typically, TCP/IP and IVI Transport Driver). When a packet is to be sent to the network, a Network Transport Driver sends it to the IVI Virtual NIC Driver 64. The IVI Virtual NIC Driver 64 simply sends the packet to the IVI Transport Driver 62, which forwards it to the corresponding real NIC Driver(s). When a packet is received from the network, the IVI Transport Driver 62 sends it to the IVI Virtual NIC Driver 64 which in turn sends it to the appropriate Network Transport Driver.

In the OSI model, the layer #2.2 (the protocol controlling a given physical interface driver) expects to communicate with systems layer #2.1 (the Network Interface Card driver) and vice versa, therefore the IVI Virtual Driver 60 is arranged in a reverse mode to the actual communication flow so that the real #2.1 and #2.2 layer operations are transparent to the intermediate driver (IVI): IVI Virtual NIC Driver 64 (a #2.1 like layer) is placed "between" the real #2.2 layer and IVI Transport Driver 62 (a #2.2 like layer) is place "above" as many real NIC drivers as physical interfaces might be used for the communication since IVI Transport Driver 62 may control several real NIC drivers for the diverse physical media employed in the data communication, behaving for every NIC driver below it as their Transport Driver. Thus, when the computer system performs operations in accordance with the #2.2 layer, instead of the operations of the #2.1 layer being executed in direct response to the calls of the operations of the #2.2 layer, operations of the 2.1 IVI layer are instead executed. Likewise, when the computer system performs operations in accordance with the #2.1 layer, instead of the operations of the #2.2 layer being executed in direct response to the calls of the operations of the #2.1 layer, operations of the 2.2 IVI layer are instead executed. The 2.1 IVI layer and the 2.2 IVI layer communicate with each other thereby bridging the interaction of the #2.1 and #2.2 layers. The IVI Transport Driver 62 includes the 2.2 IVI layer which is capable of controlling two NIC drivers and is therefore a bi-directional switch for transferring data from one or several physical interfaces/communication paths to a single real IP address/ layer, and for transferring data from a single "real" IP address/layer to one or several physical interfaces/ communication paths. Therefore the IVI module 60 is a bi-directional switch for transferring data from one or several physical interfaces/communication paths to a single "real" IP address/layer #3, and for transferring data from a single "real" IP address/layer #3 to one or several physical interfaces/communication paths.

The configuration shown in FIG. 3 shows the IVI module 60 having the Sublayer #2.2–Sublayer #2.1 upper interface and the Sublayer #2.2 Sublayer–#2.1 lower interface, to link to both existing Network Transport Drivers and NIC Drivers. However, it is not necessary for the IVI module 60 to implement new protocols for Layer 2. In an embodiment, the IVI system implements an Ethernet II upper interface and several lower interfaces. If a given network packet is to be sent through an Ethernet Network Adapter, the packet is sent to the lower driver with no further modification. If the adapter through which the packet is going to be sent is not an Ethernet Adapter, the IVI module 60 undoes the action of the upper Sublayer #2.2, that is, implementation of the Ethernet II protocol,- and implements a different Sublayer #2.2 protocol.

All communication between NDIS Network Drivers is carried by the NDIS system. So, the above embodiment with two different Network Drivers for the IVI System, creates some system overhead. In NDIS 4.0 systems, there is a new type of Network Adapter called Intermediate Network Driver. The Intermediate Network Drivers implement Sublayer #2.2–Sublayer #2.1 upper interfaces and Sublayer #2.2–Sublayer #2.1 lower interfaces. The new type of Network Driver can thus be used to implement the IVI System in only one driver for NDIS 4.0 systems, reducing system overhead (IVI Transport and Virtual NIC Drivers do not have to send packets from one to other if they are the same driver). This is the reason why, in NDIS 4.0 systems, the IVI System is implemented through the IVI Intermediate Driver 60', which encapsulates the functionality of both the IVI Transport Driver 62 and the IVI Virtual NIC Driver 64

Figure 4:
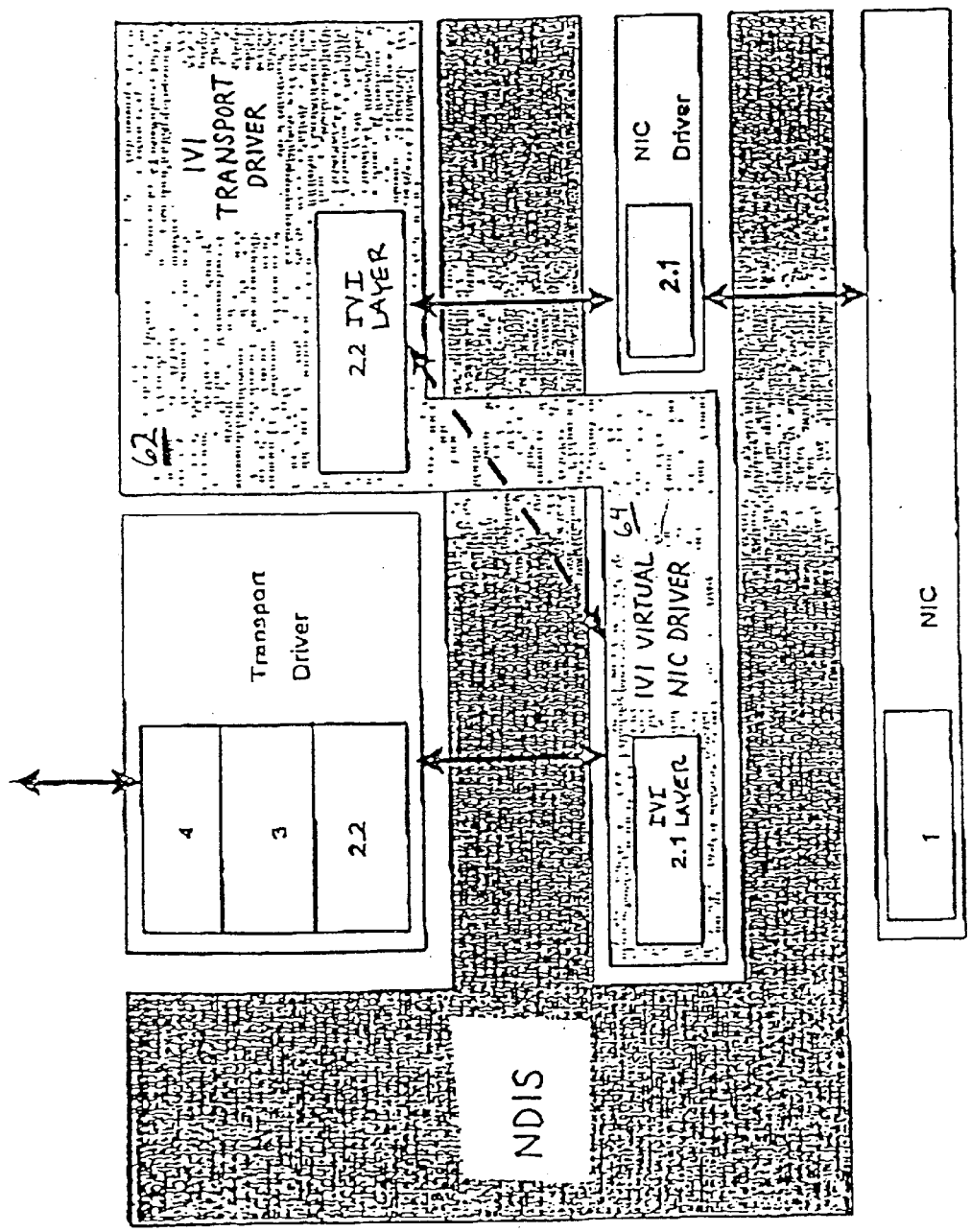
FIG. 4 is a system architecture plan of an embodiment of the present invention incorporating the IVI into the lowest four OSI layers in NDIS 3 systems for the WINDOWS 95 operating system provided by Microsoft Corporation.
Figure 5:
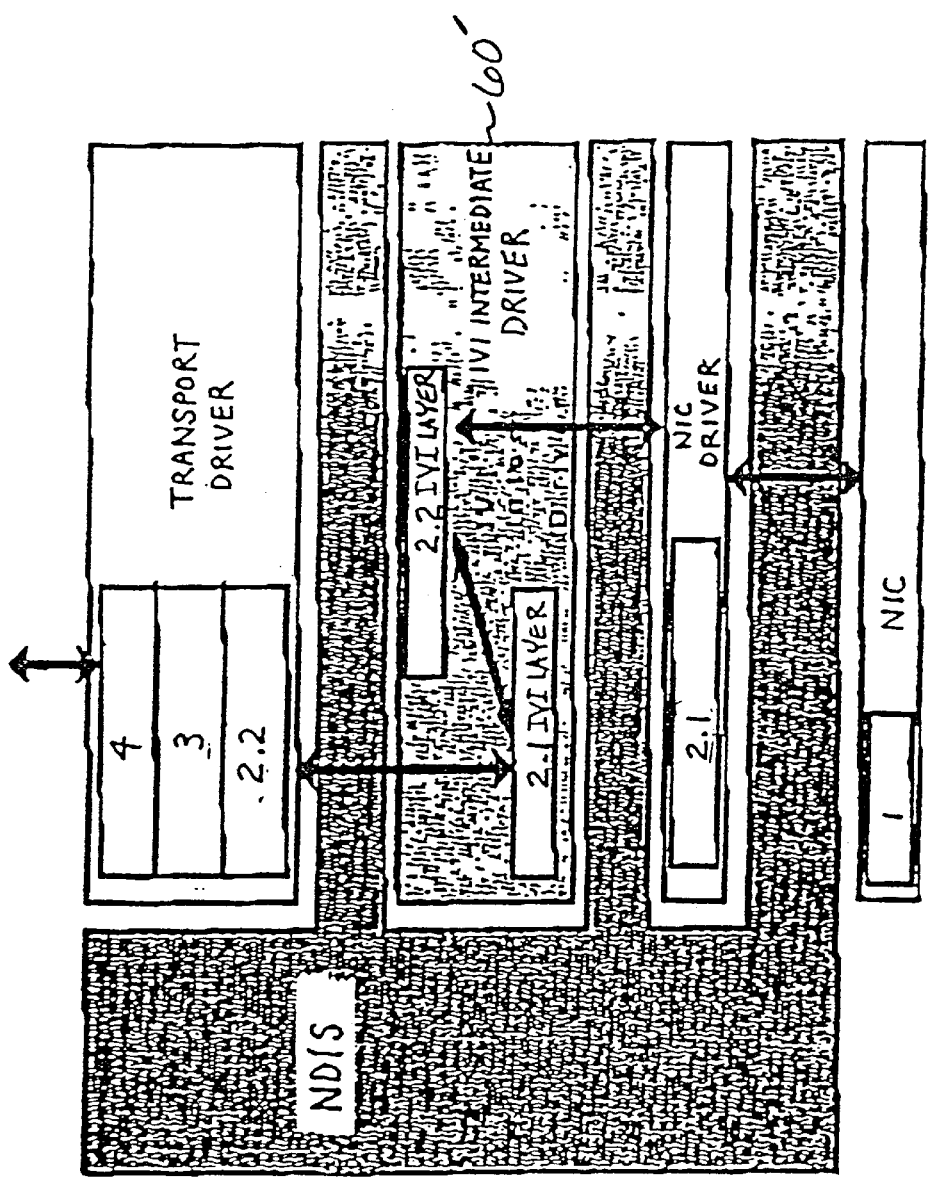
FIG. 5 is a system architecture plan of an embodiment of the present invention incorporating the IVI into the lowest four OSI layers NDIS 4 systems with IVI for Windows NT provided by Microsoft Corporation.
Figure 6:
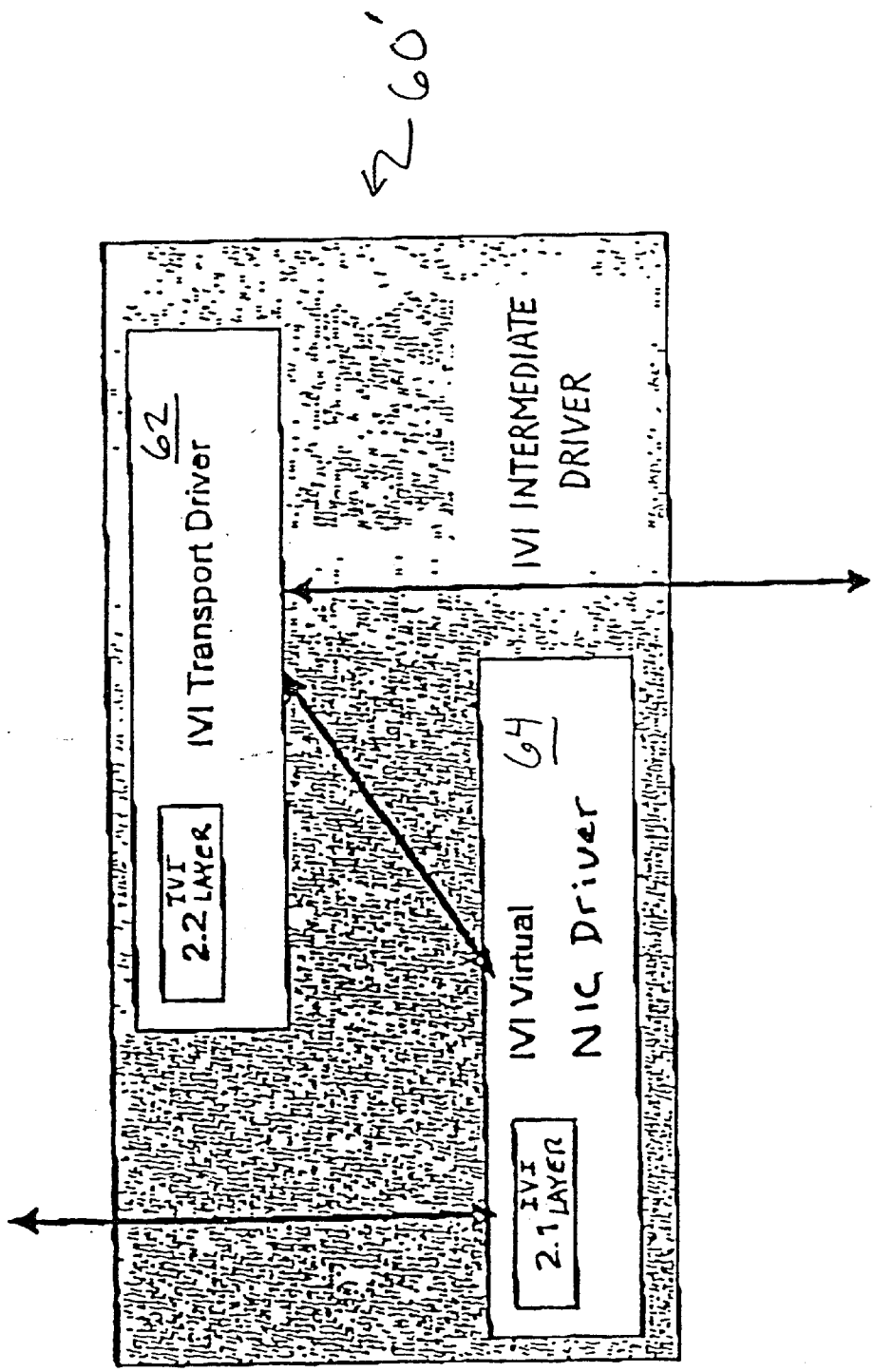
FIG. 6 is a detailed system architecture plan of the incorporation of the drivers of FIG. 4 into the system of FIG. 5.

Referring to FIGS. 4 and 5, the four lower layers of the OSI model with the NDIS architecture are shown with the insertion of IVI layer. In FIG. 4, the system architecture corresponds to nodes running NDIS 3, as is the case of Operating Systems like Windows '95. Due to the characteristics of NDIS 3, IVI internal communications between the IVI Transport Driver 62 and IVI Virtual NIC driver 64 have to be implemented through the NDIS environment. In nodes running NDIS 4, as is the case of Windows NT systems, IVI internal communications can also be implemented through or by bypassing the NDIS environment as shown in FIG. 5. A schematic of how the IVI internal drivers, the IVI Transport Driver 62 and the IVI virtual NIC Driver 64, are encapsulated in the case of NDIS 4 systems is shown in FIG. 6. Both the IVI Transport Driver 62 and the IVI virtual NIC Driver 64 communicate within the environment of the IVI intermediate driver 60'.

Figure 7:
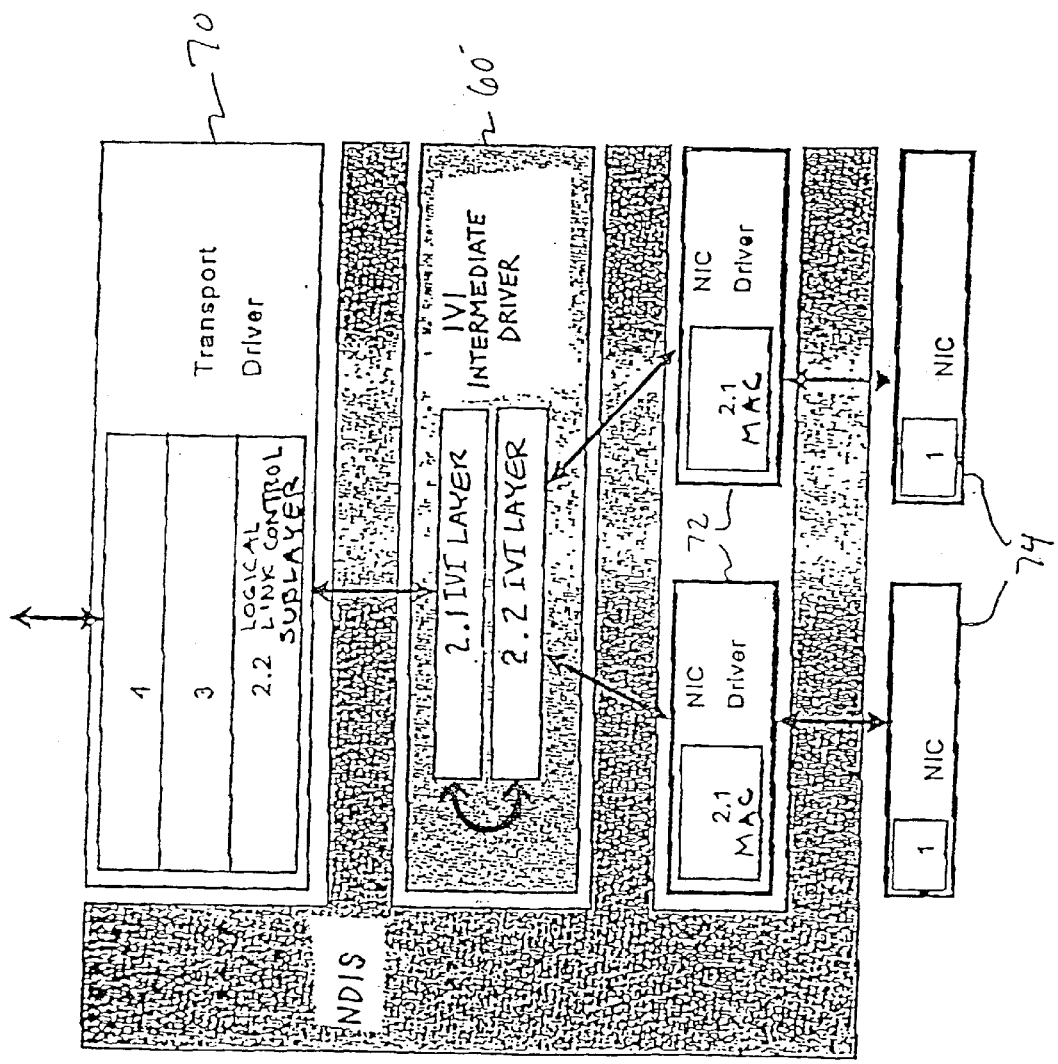
FIG. 7 is a system architecture plan for the present invention showing the IVI unifying several interfaces under a single network address.

Referring to FIG. 7, the first four OSI layers are illustrated and the flow of data handled by the IVI Intermediate Driver 60' between the Transport driver 70 and two different NIC drivers 72 and their corresponding NICs 74 is shown. The number of IP addresses handled by the IP level per node in the NDIS architecture is the number of links between the Transport driver 70 and the immediate lower level. In the "classic" NDIS architecture the immediate lower level is the NIC driver. However, the present invention interposes the IVI Intermediate Driver and its corresponding operations between the Transport driver 70 and the NIC drivers 72. Thus, although there exists at least two real NICs 74 and their corresponding NIC Drivers 72, the Transport Driver 70 has only one link with its immediate lower level, the IVI Intermediate Driver 60' which thereby combines several NICs and their controllers as a single entity from the viewpoint of the transport driver 70.

This allows the use of one-way physical interfaces terminating or starting one-way communication channels (such as digital TV/data broadcast channels through satellite, fiber/coax or microwaves) to be used for interactive data communications, as long as each node has at least one data input and one data output interface.

Figure 8:
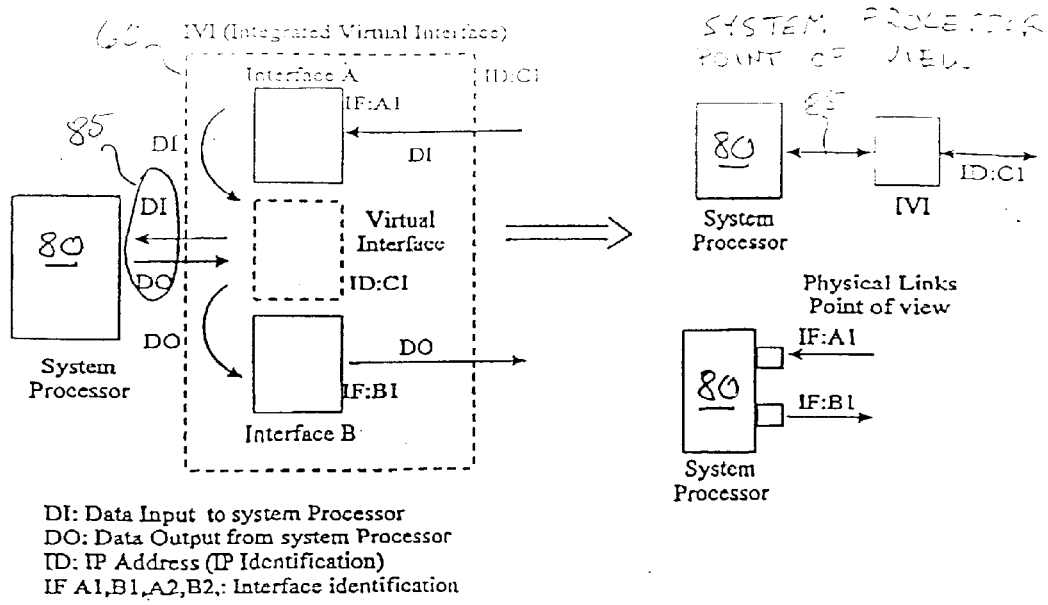
FIG. 8 is a schematic showing data flow using the IVI from viewpoints of the system process and the physical links.
Figure 9:
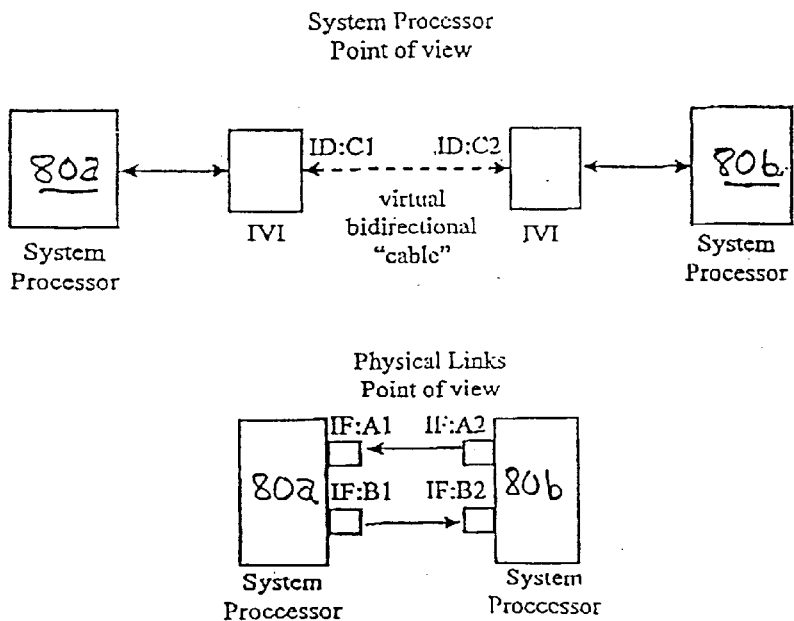
FIG. 9 presents schematics showing data flow using the IVI from viewpoints of the system processor and the physical links.

Referring to FIGS. 8 and 9, from the system processors point of view, the IVI intermediate driver 60 has combined two physical links IF:A1 and IF:B1 into a single bi-directional virtual cable 85, thereby identifying each node by a single network address (IP address in TCP/IP), in spite of the fact that, from the physical links point of view, two different physical interfaces IF:A1 and IF:B1 (Interface A and Interface B) are used per node: one for each communication link. The IVI Interface 60 functions based upon the difference between a driver of an interface and the real interface. When a system processor 80 needs to read/write from/into an interface (a network interface), the system processor reads/writes from/into the driver (interface driver). This driver operation is implemented by software (the interface driver) which controls the computer system to write and read the data to and from the real interface. The IVI system switches data input (DI) from real interface A directly from driver A to the IVI driver 60 (NDIS Driver). The system processor 80 can only read and write from and to a driver, not an interface. Thus the system processor 80 reads the data in the IVI driver 60. The data is then processed as if it came from the IVI interface 60 having a single associated IP address ID:C, although there are two underlying interfaces, IF:A for receiving data, and IF:B for transmitting data. For data transmission, data from the processor 80 is sent to the IVI driver 60, which acts as if it wrote the data into the IVI interface which doesn't exist physically, but is emulated by machine operations effecting a software simulation of a real bi-directional interface in accordance with the IVI driver 60. In reality, the IVI driver 60 writes the data to ("switches the data to") Interface B driver, which in turn places the data into the real interface B.

Figure 10:
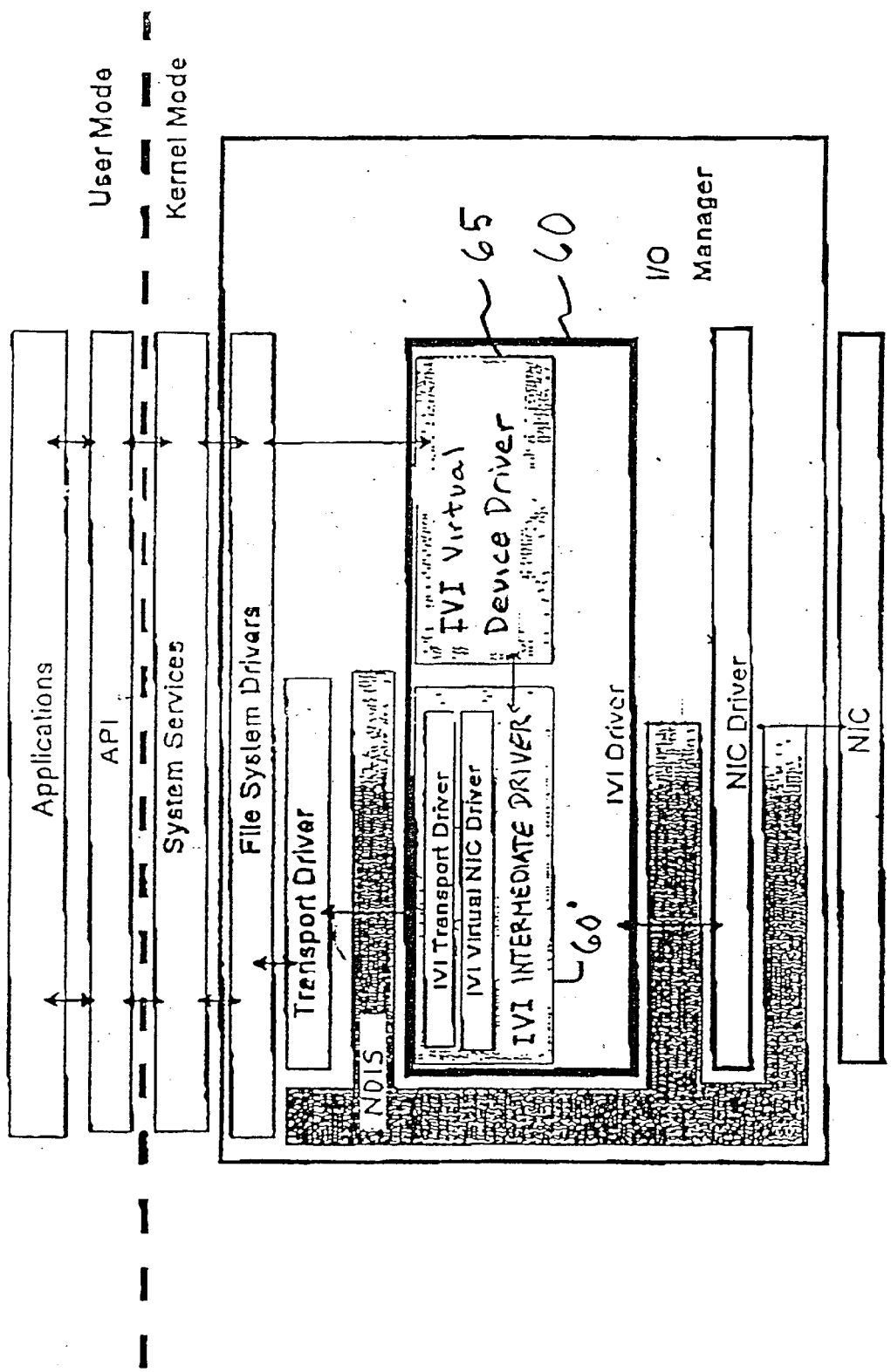
FIG. 10 is a block diagram of how IVI can be controlled from any application.
Figure 11:
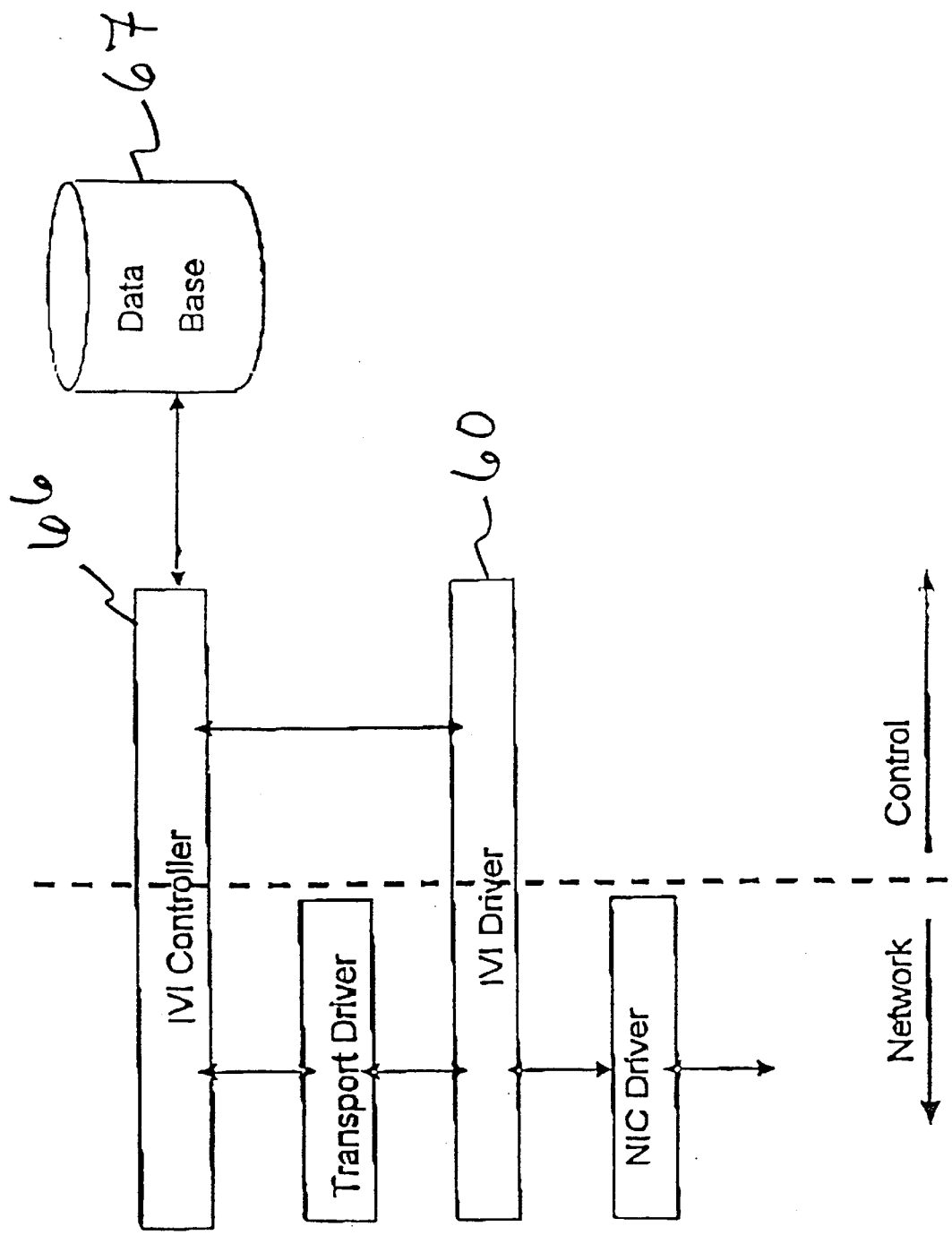
FIG. 11 is a system diagram showing how IVI functioning is controlled from a database (for the information server) or from the information transmitted by the other node (for the information server or the client) by an IVI controller.

The IVI driver 60 is controlled from any standard application through the protocol stack and the file system drivers operating in an NDIS architecture, as shown in FIG. 10. More specifically, it is controlled by an IVI controller 66 which is an application written to manage an IVI service like high speed Internet access along with digital TV from a standard IV set-top box, as shown in FIG. 11, either from database or from the information transmitted from another node.

Figure 12:
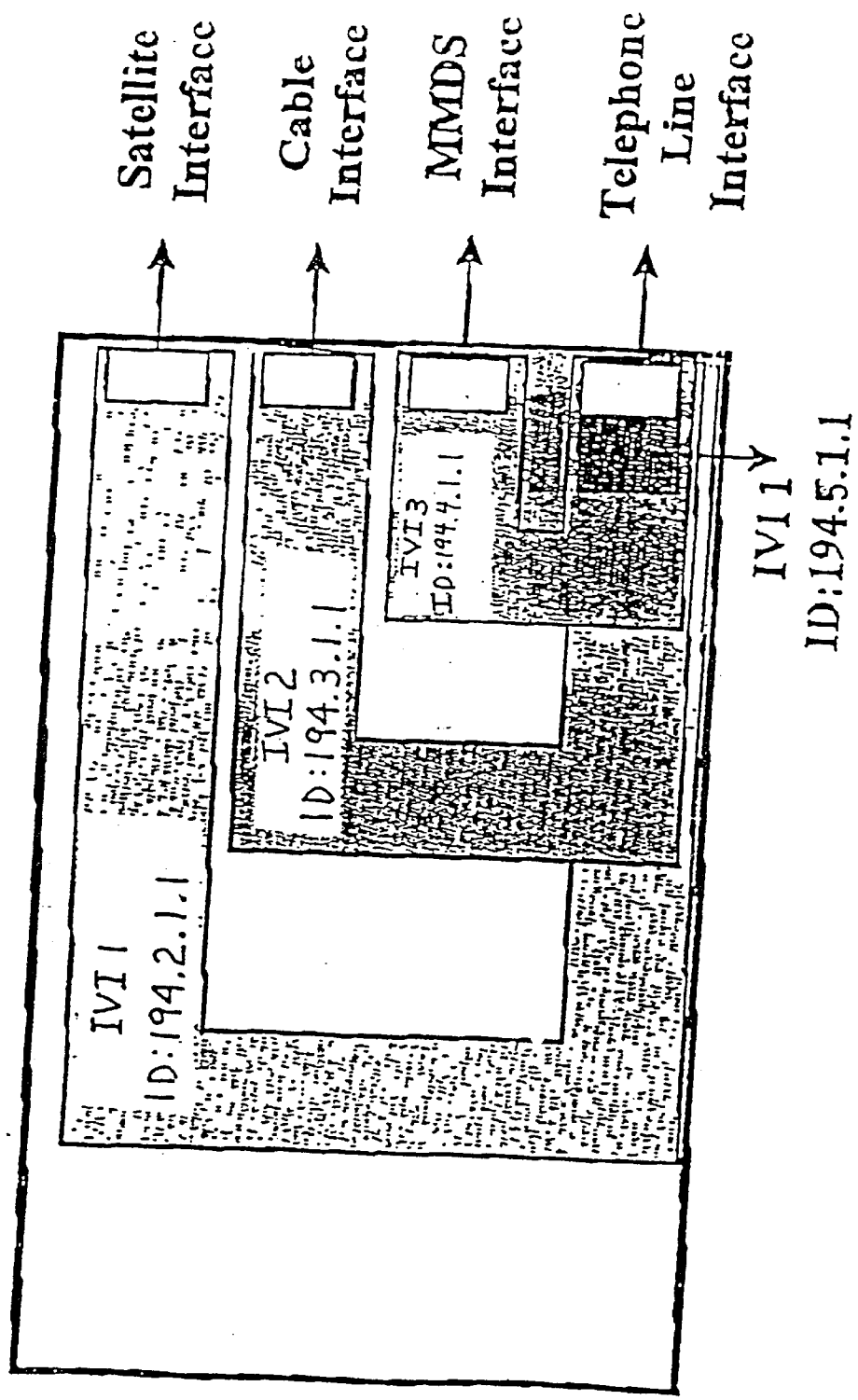
FIG. 12 shows a multi-IVI system for a data service in which information can be transmitted through different physical media from a given node to (an)other node(s).

Referring to FIG. 12, the present invention also provides for the capability of combining as many IVI drivers as desired, all using two real network interfaces for each one. The real network interfaces can belong to several IVI drivers In the system of FIG. 12, there are 4 IVI drivers, and therefore, 4 IP addresses for the system processor:

1. IVI1. ID:194.2.1.1. This driver identifies a system which is accessed using a telephone line and data from it is transmitted by satellite broadcast.
2. IVI2. ID:194.3.1.1. This driver identifies a system which is accessed using telephone line and data from it is transmitted by "cable" (typically, hybrid fiber/coaxial distribution network).
3. IVI3. ID:194.4.1.1. This driver identifies a system which is accessed using telephone line and data from it is transmitted by an MMDS/LMDS broadcast system.
4. IVI4. ID:194.5.1.1. This driver identifies a system which is accessed using telephone line and data from it is transmitted by the same telephone line.

Figure 13:
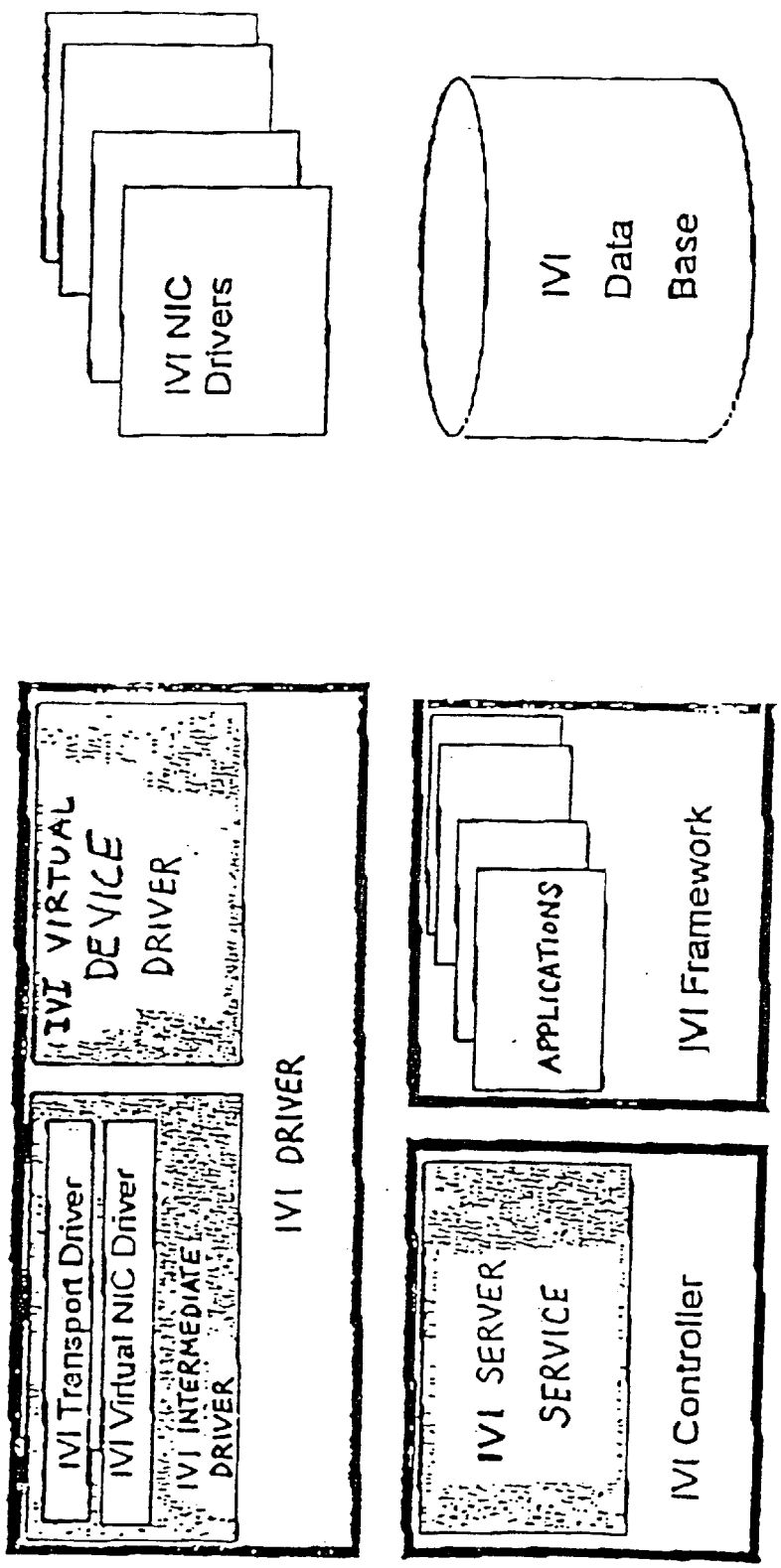
FIG. 13 shows different IVI modules implemented for multi-user communication service using IVI.

Finally, FIG. 13 summarizes a full set of applications/modules based on the IVI conception, to provide full functionality to commercial services involving high speed asymmetric data network connections.

Figure 14:
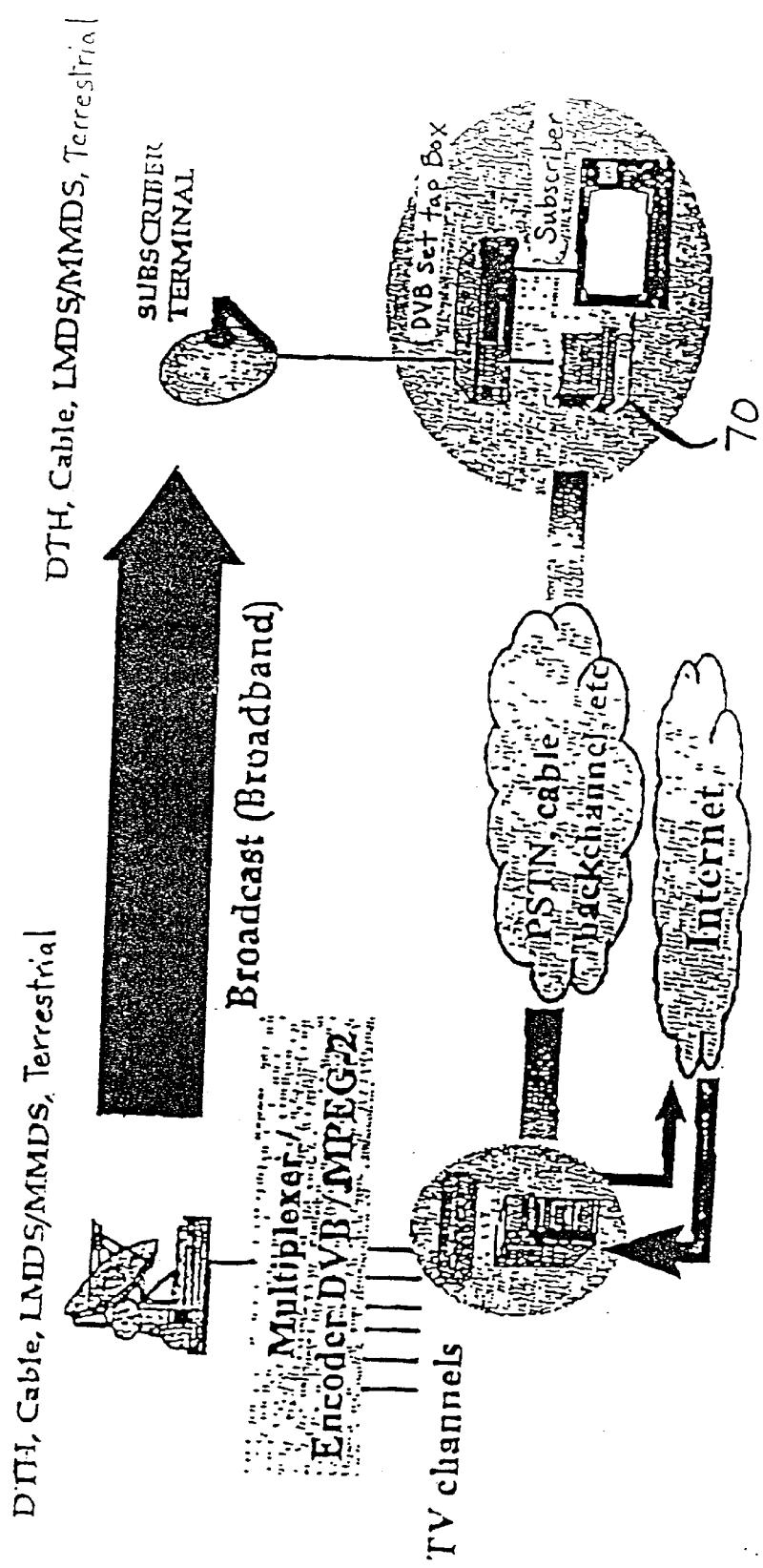
FIG. 14 shows a system for high speed Internet access provided with a digital TV service using IVI to integrate a broadband channel and a telephone backchannel.

Referring to FIG. 14, the operation of a service of fast Internet access provided by a digital TV service provider is shown using one or several of the following one-way broadcast transmission media for the downstream communications: fiber/coax, Satellite, MMDS. The user PC 70 receives the Internet data at home (at rates of up to several Mbps) from a data port in a standard digital TV set-top box DVB. For the upstream communications (return channel), the telephone line with a standard modem is used (it could be as well an X.25 or a frame relay line for a corporate user).

Figure 15:
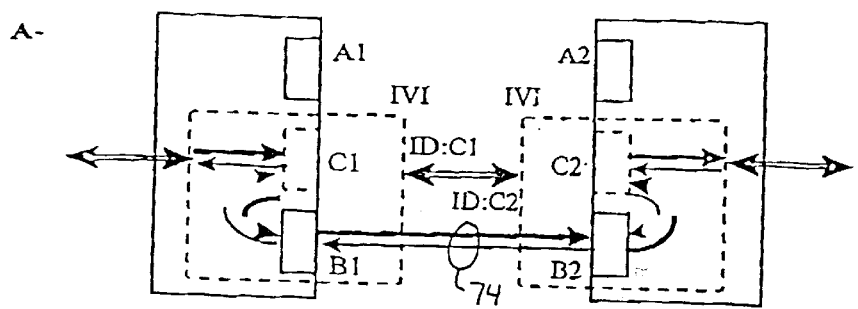
FIG. 15 shows a system set up with IVI through a bi-directional physical link, after what two different physical links carrying one-way traffic are used for the span of the ensuing communications.
Figure 15:
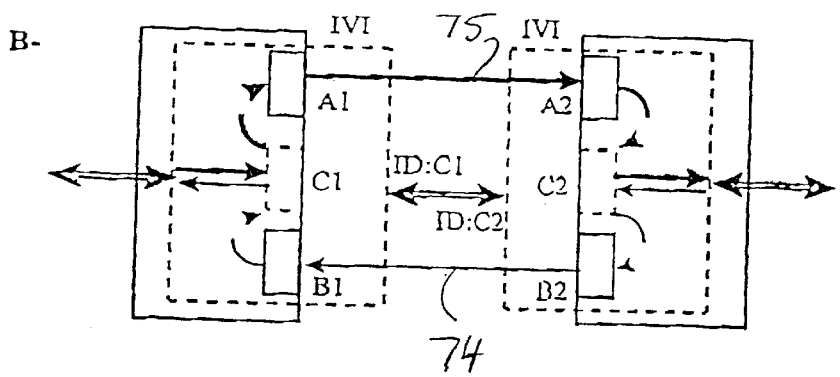

When beginning operations (case A in FIG. 15), one physical path, for example a telephone line 74 is used bi-directionally and the connection is set up as a normal connection with ID:C1 and ID:C2 private IP addresses. When the user is identified as a special user with two different communication paths for sending data/requests and receiving data over telephone line and satellite/cable/microwave connections, then the IVI system tries to open a second real interface according to the broadband medium 75 specific to each user (a subscriber of satellite service an MMDS subscriber, etc.), and if successful, the two-way communication using two physical paths 74 and 75 is established for the steady state communications as shown in case B in FIG. 15 (two different paths established), providing the user with the high speed data reception provided by the broadband channel for the information requested from the server.

If the broadcast path 75 is down, then the system switches to the case A configuration, wherein the speed is normally lower than provided by the two-way configuration of case B, but the system works without the user losing the connection.

Figure 16:
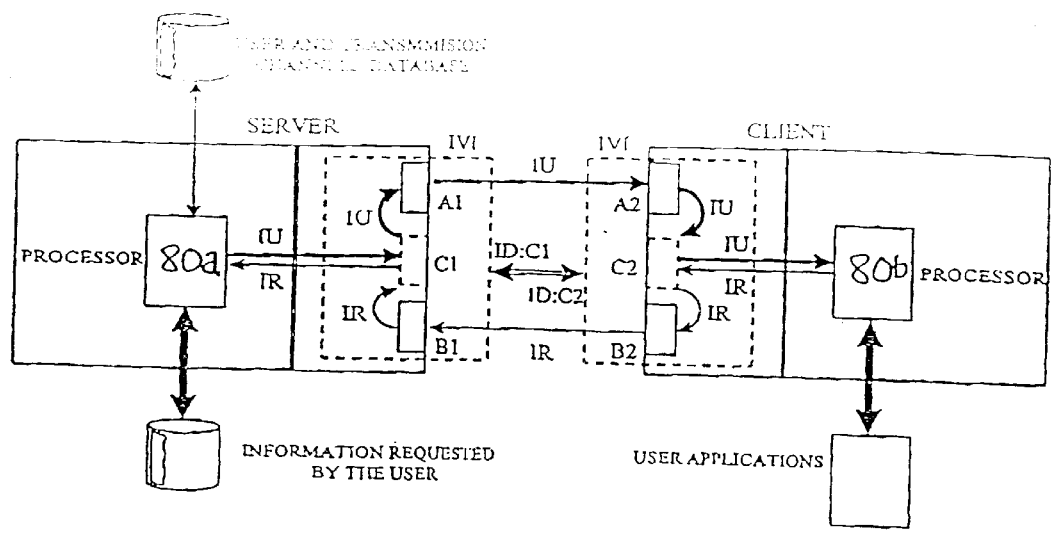
FIG. 16 is a logical schematic of data flow in a commercial information service using IVI that combines two physical paths in a single virtual two-way channel.

Referring to FIG. 16, when information IU is requested by the client, it is collected by the processor 80*b* itself. According to the user pre-established service class (priority type, bandwidth contracted, etc.), the bandwidth requested by all the users connected at any given time, and the total available bandwidth for all users, the processor 80*a* assigns a time-slot in the data multiplex to be broadcast for each user, in order to guarantee a final throughput according to the respective service features of the users. The billing account for each connected user is updated at this time, if the service is billed according to connection time or data amounts requested.

The above operation implements bandwidth management capabilities with a database application (with the necessary information on users, channels, bandwidth, etc. working in real time) and the IVI system. In the client node there is no bandwidth management (bandwidth management is executed in the server node) but it is possible to assign a specific to channel to the final user in order to make an efficient distribution of the traffic using all the available channels.

When the bandwidth guaranteed for all users connected exceeds the total broadcast capacity, an overflow may occur at some instants of time. This event can be predicted by statistical models and, in these cases, the saturated resource is reallocated to the different users according to their priority levels, distributing evenly the lower throughput between users with the same service class, and making at the same time corrections (bonuses, rebates) in the amounts billed to the users.

Figure 17:
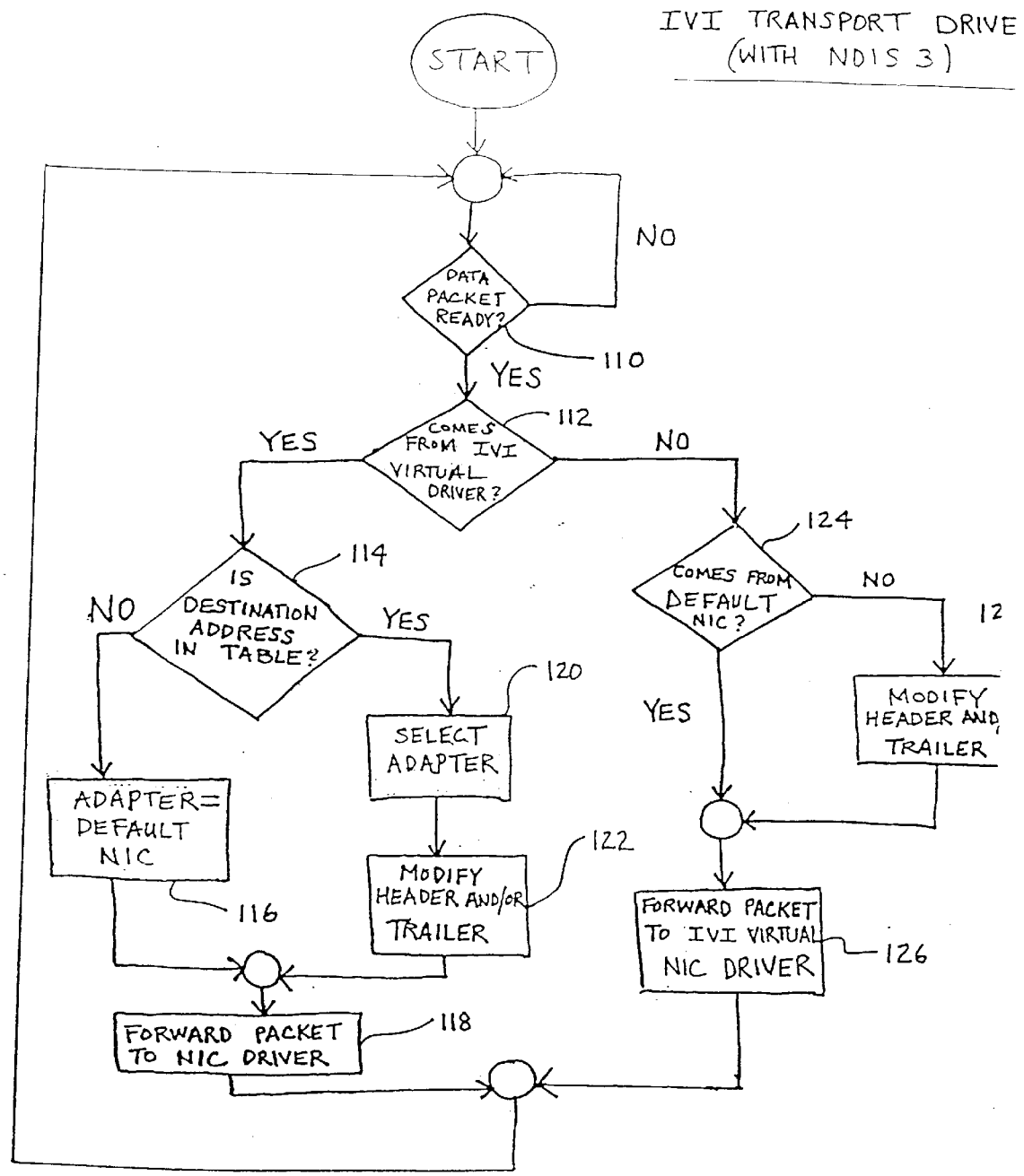
FIG. 17 is a flow chart detailing operation of the IVI Transport Driver in an NDIS 3 environment.

Referring to FIG. 17, the operation of the IVI Transport Driver 62 in an NDIS 3 environment is described. When a data packet is to be sent to the network, the IVI Virtual NIC Driver 64 sends it to the IVI Transport Driver 62. Whether a data packet is ready is detected in step 110 which is reexecuted in the event that no packet is ready. When a data packet is ready, it is determined in step 112 whether it comes from the IVI Virtual NIC driver 64. The IVI Transport Driver 64 keeps a table with information about different network address ranges. When step 112 is affirmative, it is then determined whether the network address to which the packet is to be sent is in the table in step 114. If the network address is not in any of the ranges included in the table the IVI Transport Driver 64 selects a default NIC sends in step 116 and sends the packet to the Default NIC in step 118. The default NIC is determined in the installation process. If the network address is within one of the network address ranges contained in the table, the IVI Transport Driver 64 looks in the table for the adapter the packet is to be sent selects the appropriate adapter in step 120. This choice depends on the list of adapters through which that address can be reached and the status (functioning/not functioning) of those adapters. Where the adapter the packet is being sent through is not the default NIC, the Sublayer #2.2 header and/or trailer in the packet is modified in step 122 to match that of the adapter and then sent to the adapter in step 118.

When a packet is received from the network, a Network Adapter Driver sends it to the IVI Transport Driver 62. This results in a negative result in step 112. The IVI Transport Driver 62 then determines whether the packet has come from the default NIC in step 124. If the packet is from the default NIC, the IVI Transport Driver 62 simply sends it to the IVI Virtual NIC Driver 64 in step 126. If the adapter the packet came from is not the Default NIC, the Sublayer #2.2 header and/or trailer in the packet is modified in step 128 to match that of the Default NIC and the sent to the IVI Virtual NIC Driver 64 in step 126.

Figure 18:
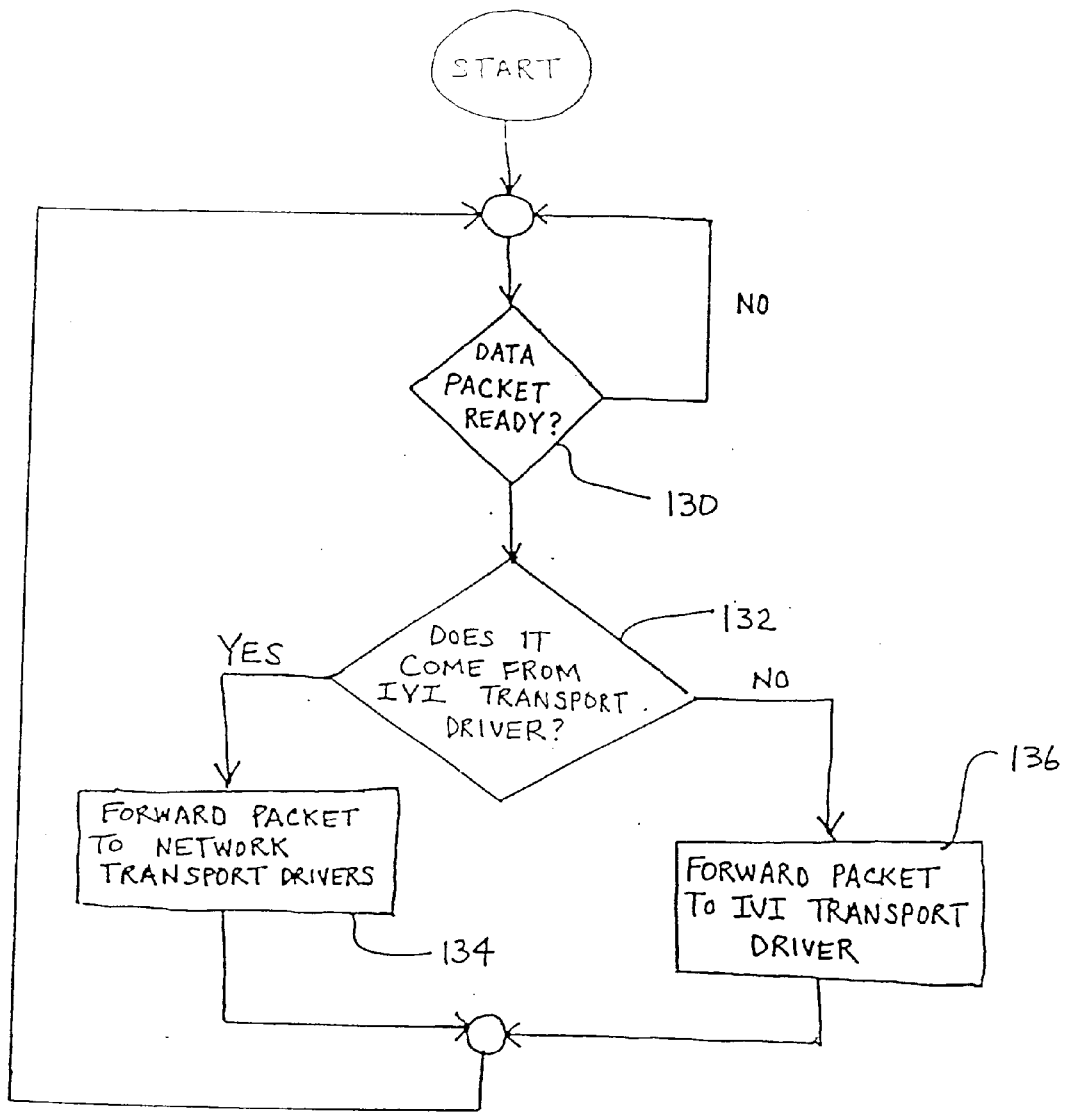
FIG. 18 is a flow chart detailing operation of the IVI Virtual NIC Driver in an NDIS 3 environment.

Referring to FIG. 18, the IVI Virtual NIC Driver 62 operation is described as follows. When a data packet is to be sent to the network, a Network Transport Driver sends it to the IVI Virtual NIC driver 64 via the IVI Transport Driver 62. Whether a data packet is ready is detected in step 130 which is reexecuted in the event that no packet is ready. When a packet is ready, it is determined whether the packet is from the IVI Transport Driver 62 in step 132. An affirmative result in step 132 means the packet is to be sent to the network and the IVI Virtual NIC Driver 64 simply sends the packet to the IVI Transport Driver 62 in step 134, which in turn forwards it to the corresponding real NIC Driver(s). When a packet is received from the network as determined by a negative result in step 132, the IVI Transport Driver 62 sends it to the IVI Virtual NIC Driver 64 in step 136 and the IVI Virtual NIC Driver 64 sends it to the appropriate Network Transport Driver.

After the installation of the IVI system in a computer, there are two modes of functioning, an idle mode wherein the IVI system performs a simple task of forwarding data and a switching mode wherein the IVI system switches data to/from the desired physical interfaces.

Based on the above operations described with reference to FIGS. 17 and 18, it is clear that in the idle mode, when a data packet is to be sent to the network, a Network Transport Driver sends it to the IVI Virtual NIC Driver 64 which in turn sends it to the IVI Transport Driver 62 to send it to the Default NIC Network Adapter Driver. Thus, the output to the network is the same as if the IVI System was not installed and the packet was sent directly from the Network Transport Driver to the Default NIC Network Adapter Driver. On the other hand, when a packet arrives from the network, the packet is sent to the IVI Transport Driver 62 by the Network Adapter Driver. The IVI Transport Driver 62 modifies the packet to look like if it had arrived through the Default NIC and sends it to the IVI Virtual NIC Driver 64 to forward it to the appropriate Network Transport Driver. Thus, the input from the network is the same as if the IVI System was not installed and the packet was received directly from the Default NIC Network Adapter Driver and transferred to a Network Transport Driver (the only difference is that input (s) from adapters other than the Default NIC is/are sent to the Network Transport Drivers). In the switching mode, the IVI system detects whether a data packet is to be sent through or is received from a NIC driver other than the Default NIC and modifies the header and/or trailer as discussed above and chooses an appropriate NIC adapter other than the Default NIC adapter when data is to be sent through the network.

Figure 19:
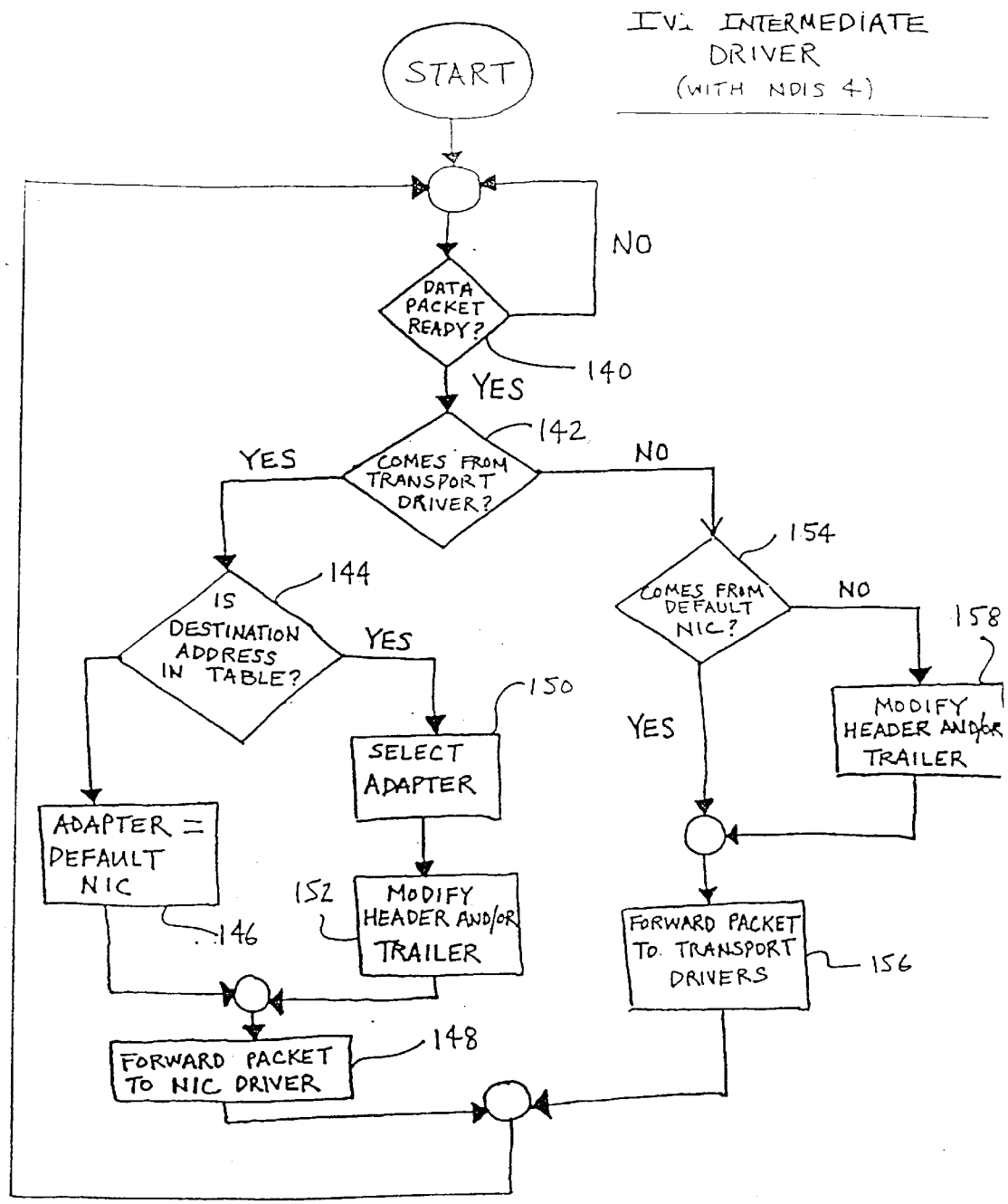
FIG. 19 is a flow chart detailing operation of the IVI Intermediate NIC Driver in an NDIS 4 environment.

Referring to FIG. 19, the IVI Intermediate Driver 60' operation in the NDIS 4 environment begins with determining whether a data packet is ready is detected in step 140 which is reexecuted in the event that no packet is ready. When a packet is to be sent to the network, a Network Transport Driver sends it to the IVI Intermediate Driver 60'. Thus, following detection of a packet being ready, the IVI Intermediate Driver next determines in step 142 whether the packet is from a Network Transport Driver. The IVI Intermediate Driver 60' keeps a table with information about different network address ranges. If the result of step 142 is affirmative, it is determined in step 144 whether the network address to which the packet is to be sent is in the table. If the network address is not in any of the ranges included in the table the IVI Intermediate Driver 62 selects a default NIC in step 146 and sends the packet to the Default NIC in step 148. The default NIC is determined in the installation process. If the network address is within one of the network address ranges contained in the table, the IVI Intermediate Driver 62 looks in the table for the adapter the packet is to be sent selects the appropriate adapter in step 150. This choice depends on the list of adapters through which that address can be reached and the status (functioning/not functioning) of those adapters. Where the adapter the packet is being sent through is not the default NIC, the Sublayer #2.2 header and/or trailer in the packet is modified in step 152 to match that of the adapter and then sent to the adapter in step 148.

When a packet is received from the network, a Network Adapter Driver sends it to the IVI Intermediate Driver 60'. This results in a negative result in step 142. The IVI Intermediate Driver 60 then determines whether the packet has come from the default NIC in step 154. If the packet is from the default NIC, the IVI Intermediate Driver 60 simply sends it to the Network Transport Driver in step 156. If the adapter the packet came from is not the Default NIC, the Sublayer #2.2 header and/or trailer in the packet is modified in step 158 to match that of the Default NIC and the sent to the Network Adapter Driver in step 156. Thus, the resulting system is similar to that of NDIS 3.0 IVI systems.

Referring again to FIGS. 10 and 11, the mechanism used to control the system is achieved by an IVI Virtual Device Driver 65. The IVI Virtual Device Driver 65 creates a virtual device in the file system name space. Any application can communicate with the IVI Virtual Device Driver 65 by generic file read/file write operations. The IVI Virtual Device Driver 65 treats any information written to the IVI Virtual Device Driver 65 as commands, and applications get feedback by reading from that device. For example, any application with appropriate access rights could write a "query statistics command" to the device and, after that, read the number of bytes/packets sent to a given network address range.

Both the IVI Virtual Device Driver 65 and the IVI Intermediate Driver 60' are encapsulated in the IVI Driver 60. Being in the same driver, the IVI Virtual Device Driver 65 can access the IVI Intermediate Driver data, such as the switching table, the statistics and status information, etc. The application used to control the IVI system by writing to/reading from the IVI Virtual Device Driver 65 is the IVI Controller 66.

Upon system boot at a client node, the IVI Controller 66 starts listening to a UDP socket in a port of the IVI Server (IVI Server network address is supplied by the user at installation time). The IVI Driver 60 works in the previously defined idle mode. Provided that at least one of the network adapters of the IVI Intermediate Driver 60' is linked to a broadcast input driver, the client node can receive data from the server node through the UDP socket. If it receives a command from the IVI server node, instructing the IVI client node to open the connection, the IVI Controller 66 starts the open connection procedure described below. The IVI System is optionally configured to ask for confirmation before starting the open connection procedure. Open connection procedure is also startable by a manual request from the user.

Upon system boot at a sever node, the IVI Controller 66 opens an output UDP socket used to send information to the IVI client nodes. The IVI Driver 60 works in the previously defined idle mode. The user can instruct the IVI Controller 66 to send a command to instruct a given IVI client node to start an open connection procedure described below.

Once a connection is open, the IVI Controller 66 instructs the IVI Intermediate Driver 60' through the IVI Virtual Device Driver 65 to switch all packets directed to the IVI client node network address range to a Network Adapter other than the Default NIC. Periodically, until the connection is shut down, the IVI Controller 66 reads from the IVI Intermediate Driver 60', through the IVI Virtual Device Driver 65, statistics on the amount of packets send to or received from that network address range.

The IVI Controller 66 uses a database 67 to store information about users. The information consists of: a unique identifier of each IVI client node (for example, the Set Top Box serial number) used to send it the open connection command; information about IVI service for that client (guaranteed bandwidth, list of output adapters the IVI client node is listening to, physical address of IVI client node input adapters, etc.); and billing information (bytes/packets sent/received, number of connections, total connection time, etc.).

Figure 20:
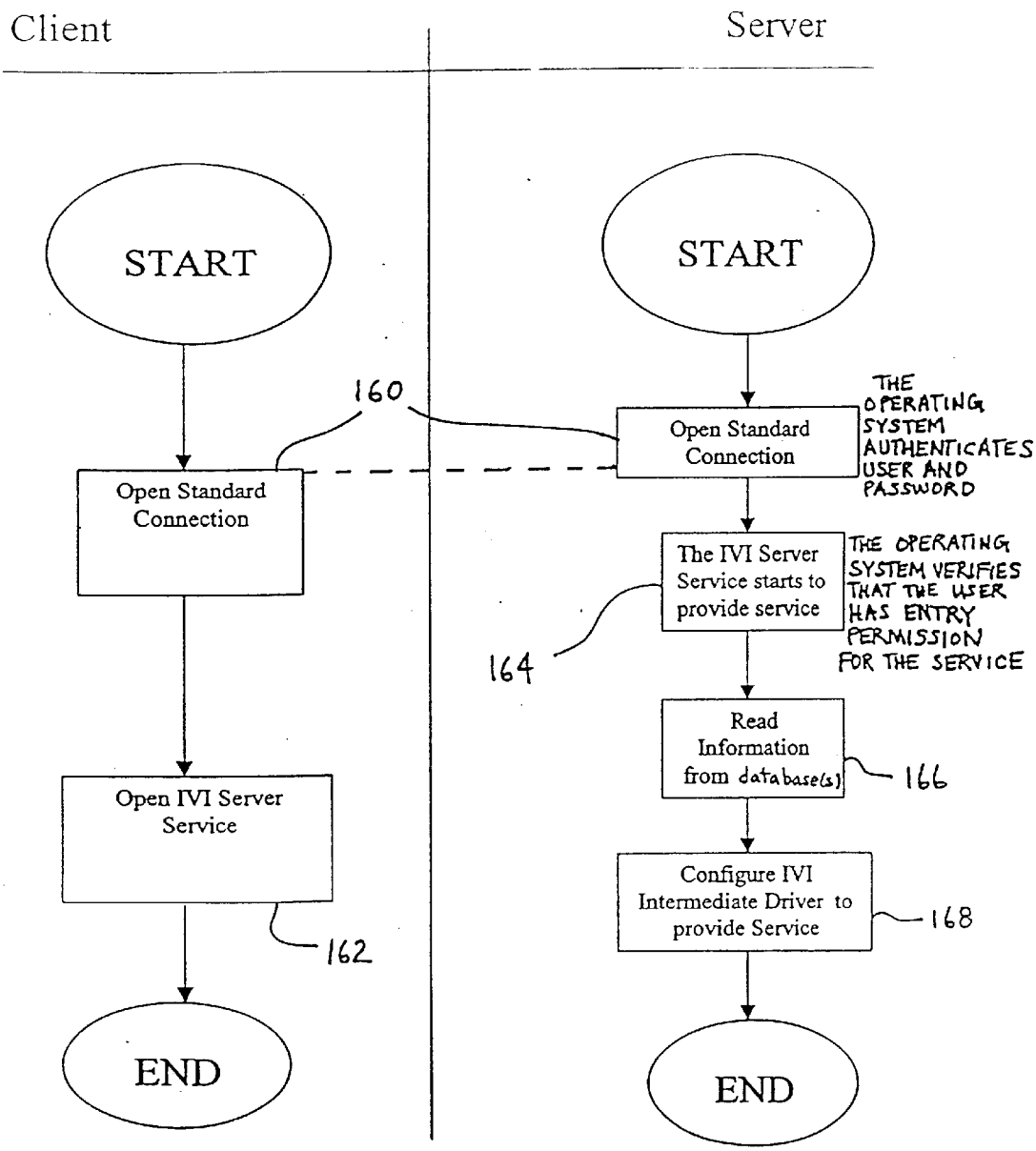
FIG. 20 is a flow chart detailing operation of a procedure to open a connection between client and server nodes.

The IVI client node is always the one that starts the "open connection" procedure, following a user request or an IVI server node command. Referring to FIG. 20, a first step 160 is to open a standard network connection to the server. This step is necessary only if the communication between the IVI server node and the IVI client node is through a WAN. To open the network connection, the IVI Controller 66 in the IVI client node uses standard operating system mechanisms (dialup networking for example). The operating system of the IVI server node verifies the user and password to establish the standard network connection. The IVI server node starts providing service in step 164 after verifying entry permission for the service. Once a standard network connection to the server is open, the IVI Controller 66 in the IVI client node tries to open a service provided by a service encapsulated in the IVI Controller 66 in the IVI server node, IVI Server Service, in step 162. The mechanism used to open the IVI Server Service is the standard mechanism to do that provided by the operating system (the operating system checks user access rights on that service through the user name used to open the connection) The IVI server instructs the IVI Controller 66 to start giving service to the IVI client node in step 166 using the information in the IVI Database for that user. The IVI Intermediate Driver 60' is then configured to provide IVI service in step 168 based on information obtained from the data base 67. The system then works in previously defined switching mode until standard connection between IVI server node and IVI client node is shut down.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In an apparatus for executing bi-directional communication with another apparatus wherein the apparatus has a processor and memory configured to execute operations in accordance with the ISO OSI model for data communications including network layer means for executing a network layer set of operations for communicating over a single physical link and a data link layer means for executing a set of data link operations in response to said network layer set of operations, each in accordance with the ISO OSI model, the improvements comprising:

a first network interface card for communicating data over a first physical link connected with said another apparatus in a first direction to said another apparatus;

said data link layer means including a first data link driver means for controlling said first network interface card;

a second network interface card for communicating data over a second physical link connected with said another apparatus in a second direction from said another apparatus;

said data link means including a second data link driver means for controlling said second network interface card;

first interfacing means for receiving output data from said network layer set of operations to be transmitted in said first direction associated with a unique address and for controlling said data link layer means to effect transmission of said output data via said first network interface card; and second interfacing means for receiving input data from said data link operations which is transmitted in said second direction and received by said second network interface card for transferring said input data to said network layer set of operations in association with only said unique address.

2. The apparatus according to claim 1 wherein said first network interface card performs bi-directional communications over said first physical link.

3. The apparatus according to claim 1 where said first and second interfacing means communicate with said network layer means via said data link layer means.

4. In a apparatus for executing bi-directional communication with another apparatus wherein the apparatus has a processor and memory configured to execute operations in accordance with ISO OSI model for data communications including network layer means for executing a network layer set of operations for communicating over a single physical link to a unique address and a data link layer means for executing a set of data link operations in response to said network layer set of operations, said data link layer means including a logical link controller means for performing logical link operations and a media access control means for performing media access operations which are configured to interface with each other, each in accordance with the ISO OSI model, the improvements comprising:

a first network interface card for communicating data over a first physical link connected with said another apparatus in a first direction to said another apparatus;

said media access control means including a first data link driver means for controlling said first network interface card;

a second network interface card for communicating data over a second physical link connected with said anther apparatus in a second direction from said another apparatus;

said media access control means including a second data link driver means for controlling said second network interface card;

intermediate interfacing means for interfacing with said logical link controller means in place of said media access control means and exchanging data in association with said unique address, and for interfacing with said first and second data link driver means and exchanging said data with said first and second data link driver means such that said logical link controller means performs logical link operations associated only with said unique address.

5. The apparatus according to claim 4 wherein said first network interface card performs bi-directional communications over said first physical link.

6. The apparatus according to claim 4 further comprising:

said first network interface card including means for performing bi-directional communications over said first physical link;

initiation means for initiating bi-directional communication with said another apparatus via said first network interface card and instructing said another apparatus to initiate communication via said second physical link and said second network interface card; and communication control means, responsive to establishment of said communication via said second physical link and said second network interface card, for conducting unidirectional communication sending data to said another apparatus using said first network interface card.

7. The apparatus according to claim 6 further comprising backup means for reestablishing bi-directional communication with said another apparatus using said first network interface card and said first physical link when said communication via said second physical link and said second network interface card fails.

8. In an apparatus for executing bi-directional communication with another apparatus wherein the apparatus has a processor and memory configured to execute operations in accordance with the ISO OSI model for data communications including network layer means for executing a network layer set of operations for communicating over a single physical link to a unique address and a data link layer means for executing a set of data link operations in response to said network layer set of operations, the data link layer means including a logical link controller means for performing logical link operations and a media access control means for performing media access operations which are configured to interface with each other, each in accordance with the ISO OSI model, the improvements comprising:

a first network interface card for communicating data over a first physical link connected with said another apparatus in a first direction to said another apparatus;

said media access control means including a first data link driver means for controlling said first network interface card;

a second network interface card for communicating data over a second physical link connected with said another apparatus in a second direction from said another apparatus.

said media access control means including a second data link driver means for controlling said second network interface card;

first intermediate interfacing means for interfacing with said logical link controller means in place of said media access control means and exchanging data in association with said unique address; and second intermediate interfacing means for interfacing with said first and second data link driver means and exchanging said data with said first and second data link driver means respectively at first and second real addresses, said second intermediate interfacing means including means for interfacing with said first intermediate interfacing means to said unique address.

9. The apparatus according to claim 8 wherein said first interfacing means performs media access control operations and said second interfacing means performs logical link operations.

10. The apparatus according to claim 8 wherein said first network interface card performs bi-directional communications over said first physical link.

11. In an apparatus for executing bi-directional communication with another apparatus wherein the apparatus has a processor and memory and the apparatus is configured to execute operations in accordance with the ISO OSI model for data communications including network layer means for executing a network layer set of operations for communicating over a single physical link and a data link layer means for executing a set of data link operations in response to aid operations of said network layer means, the data link layer means including a logical link controller means for performing logical link operations having lower 2.2 sublayer interface and said data link layer means including a media access control means for performing media access operations having an up er 2.1 sublayer interface, each in accordance with the ISO OSI model, the improvements consisting of:

a first network interface card for communicating data over a first physical link connected with said another apparatus in a first direction to said another apparatus;

said media access control means including a first data link driver means for controlling said first network interface card;

a second network interface card for communicating data over a second physical link connected with said a other apparatus in a second direction from said another apparatus;

said media access control means including a second data link driver means for controlling said second network interface card;

first intermediate interfacing means having an upper 2.1 sublayer interface for interfacing with said lower 2.2 sublayer interface of said logical link controller means in place of said media access control means and exchanging data in association with only one unique address; and second intermediate interfacing means having a lower 2.2 sublayer interface for interfacing with said upper 2.1 sublayer interface of said media access control means to communicate with said first and second data link driver means and exchange said a with said first and second data link driver means in association with respective ones of first and second real addresses, said second intermediate interfacing means including means for interfacing with said first intermediate interfacing means.

* * * * *